United States Patent
He et al.

(10) Patent No.: US 11,562,243 B2
(45) Date of Patent: Jan. 24, 2023

(54) MACHINE-LEARNING MODELS BASED ON NON-LOCAL NEURAL NETWORKS

(71) Applicant: Meta Platforms, Inc., Menlo Park, CA (US)

(72) Inventors: Kaiming He, Menlo Park, CA (US); Ross Girshick, Seattle, WA (US); Xiaolong Wang, Pittsburgh, PA (US)

(73) Assignee: Meta Platforms, Inc., Menlo Park, CA (US)

( * ) Notice: Subject to any disclaimer, the term of this patent is extended or adjusted under 35 U.S.C. 154(b) by 983 days.

(21) Appl. No.: 16/192,649

(22) Filed: Nov. 15, 2018

(65) Prior Publication Data
US 2019/0156210 A1 May 23, 2019

Related U.S. Application Data

(60) Provisional application No. 62/587,884, filed on Nov. 17, 2017.

(51) Int. Cl.
| | | |
|---|---|---|
| *G06N 3/08* | (2006.01) | |
| *G06F 17/15* | (2006.01) | |
| *G06N 3/04* | (2006.01) | |
| *G06F 16/903* | (2019.01) | |

(52) U.S. Cl.
CPC ............ *G06N 3/082* (2013.01); *G06F 16/903* (2019.01); *G06F 17/15* (2013.01); *G06N 3/0418* (2013.01)

(58) Field of Classification Search
CPC ..... G06F 16/903; G06F 17/15; G06N 3/0418; G06N 3/082
See application file for complete search history.

(56) References Cited

U.S. PATENT DOCUMENTS

| | | |
|---|---|---|
| 8,374,974 B2 | 2/2013 | Chen |
| 9,386,080 B2 | 7/2016 | Nowak |
| 9,477,925 B2 | 10/2016 | Seide |

(Continued)

OTHER PUBLICATIONS

Baudes et al. ,A Non-Local Algorithm for Image Denoising, 2005 IEEE Computer Society Conference on Computer Vision and Pattern Recognition (CVPR'05), vol. 2, pp. 60-65. IEEE, 2005. (Year: 2005).*

(Continued)

*Primary Examiner* — Kamran Afshar
*Assistant Examiner* — Marshall L Werner
(74) *Attorney, Agent, or Firm* — Baker Botts L.L.P.

(57) ABSTRACT

In one embodiment, a method includes training a baseline machine-learning model based on a neural network comprising a plurality of stages, wherein each stage comprises a plurality of neural blocks, accessing a plurality of training samples comprising a plurality of content objects, respectively, determining one or more non-local operations, wherein each non-local operation is based on one or more pairwise functions and one or more unary functions, generating one or more non-local blocks based on the plurality of training samples and the one or more non-local operations, determining a stage from the plurality of stages of the neural network, and training a non-local machine-learning model by inserting each of the one or more non-local blocks in between at least two of the plurality of neural blocks in the determined stage of the neural network.

19 Claims, 16 Drawing Sheets

(56) References Cited

U.S. PATENT DOCUMENTS 9,536,207 B2  1/2017  Traupman
9,619,748 B1  4/2017  Commons

OTHER PUBLICATIONS

He et al., Channel Pruning for Accelerating Very Deep Neural Networks, Aug. 2017. (Year: 2017).*
Jaderberg et al., Spatial Transformer Networks, Feb. 2016. (Year: 2016).*
Vaswani et al., Attention Is All You Need, Jun. 2017. (Year: 2017).*
International Search Report and Written Opinion for International Application No. PCT/US2018/061487, dated Mar. 12, 2019.
Wang et al., Non-local Neural Networks, arxiv.org, arXiv:1711.07971v3[cs.CV], Apr. 13, 2018, 11 pages, dated Apr. 13, 2018.
Barnes, Connelly, Eli Shechtman, Adam Finkelstein, and Dan B. Goldman. "PatchMatch: A randomized correspondence algorithm for structural image editing." *ACM Trans. Graph.* 28, No. 3 (2009): 24, Aug. 3, 2009.
Bian, Yunlong, Chuang Gan, Xiao Liu, Fu Li, Xiang Long, Yandong Li, Heng Qi, Jie Zhou, Shilei Wen, and Yuanging Lin. "Revisiting the effectiveness of off-the-shelf temporal modeling approaches for large-scale video classification." *arXiv preprint arXiv:1708.03805*, Aug. 12, 2017.
Buades, Antoni, Bartomeu Coll, and J-M. Morel. "A non-local algorithm for image denoising." in *2005 IEEE Computer Society Conference on Computer Vision and Pattern Recognition (CVPR'05)*, vol. 2, pp. 60-65. IEEE, Jun. 20, 2005.
Burger, Harold C., Christian J. Schuler, and Stefan Harmeling. "Image denoising: Can plain neural networks compete with BM3D?." in *2012 IEEE conference on computer vision and pattern recognition*, pp. 2392-2399. IEEE, 2012, Jun. 16, 2012.
Carreira, Joao, and Andrew Zisserman. "Quo vadis, action recognition? a new model and the kinetics dataset." in *proceedings of the IEEE Conference on Computer Vision and Pattern Recognition*, pp. 6299-6308, 2017.
Chen, Liang-Chieh, George Papandreou, Iasonas Kokkinos, Kevin Murphy, and Alan L. Yuille. "Semantic image segmentation with deep convolutional nets and fully connected crfs." *arXiv preprint arXiv:1412.7062*, Dec. 22, 2014.
Dabov, Kostadin, Alessandro Foi, Vladimir Katkovnik, and Karen Egiazarian. "Image denoising by sparse 3-D transform-domain collaborative filtering." *IEEE Transactions on image processing* 16, No. 8 (2007): pp. 2080-2095, Jul. 16, 2007.
Donahue, Jeffrey, Lisa Anne Hendricks, Sergio Guadarrama, Marcus Rohrbach, Subhashini Venugopalan, Kate Saenko, and Trevor Darrell. "Long-term recurrent convolutional networks for visual recognition and description." in Proceedings of the IEEE conference on computer vision and pattern recognition, pp. 2625-2634, 2015.
Efros, Alexei A., and Thomas K. Leung. "Texture synthesis by non-parametric sampling." in *Proceedings of the seventh IEEE international conference on computer vision*, vol. 2, pp. 1033-1038. IEEE, Sep. 20, 1999.
Feichtenhofer, Christoph, Axel Pinz, and Richard P. Wildes, "Spatiotemporal multiplier networks for video action recognition." in *Proceedings of the IEEE conference on computer vision and pattern recognition*, pp. 4768-4777. 2017.
Gehring, Jonas, Michael Auli, David Grangier, Denis Yarats, and Yann N. Dauphin. "Convolutional sequence to sequence learning." *arXiv preprint arXiv:1705.03122*, May 8, 2017.
Glasner, Daniel, Shai Bagon, and Michal Irani. "Super-resolution from a single image." in *2009 IEEE 12th international conference on computer vision*, pp. 349-356. IEEE, Sep. 29, 2009.
Goyal, Priya, Piotr Dollár, Ross Girshick, Pieter Noordhuis, Lukasz Wesolowski, Aapo Kyrola, Andrew Tulloch, Yangqing Jia, and Kaiming He. "Accurate, large minibatch sgd: Training imagenet in 1 hour." *arXiv preprint arXiv:1706.02677*, Jun. 8, 2017.
He, Kaiming, Georgia Gkioxari, and Piotr Doll. ", ar, and Ross, Girshick,"Mask r-cnn," in, ICCV. (2017): 2980-2988, 2017.
He, Kaiming, Xiangyu Zhang, Shaoqing Ren, and Jian Sun. "Delving deep into rectifiers: Surpassing human-level performance on imagenet classification." in *Proceedings of the IEEE international conference on computer vision*, pp. 1026-1034. 2015.
He, Kaiming, Xiangyu Zhang, Shaoqing Ren, and Jian Sun. "Deep residual learning for image recognition." in *Proceedings of the IEEE conference on computer vision and pattern recognition*, pp. 770-778. 2016.
Hinton, Geoffrey E., Nitish Srivastava, Alex Krizhevsky, Ilya Sutskever, and Ruslan R. Salakhutdinov. "Improving neural networks by preventing co-adaptation of feature detectors." *arXiv preprint arXiv:1207.0580* (2012).
Hochreiter, Sepp, and Jürgen Schmidhuber. "Long short-term memory." *Neural computation 9*, No. 8 (1997): 1735-1780, Nov. 5, 1997.
Ioffe, Sergey, and Christian Szegedy. "Batch normalization: Accelerating deep network training by reducing internal covariate shift." *arXiv preprint arXiv:1502.03167*, Feb. 11, 2015.
Ji, Shuiwang, Wei Xu, Ming Yang, and Kai Yu. "3D convolutional neural networks for human action recognition." *IEEE transactions on pattern analysis and machine intelligence* 35, No. 1 (2012): 221-231, Mar. 6, 2012.
Kay, Will, Joao Carreira, Karen Simonyan, Brian Zhang, Chloe Hillier, Sudheendra Vijayanarasimhan, Fabio Viola et al. "The kinetics human action video dataset." *arXiv preprint arXiv:1705.06950*, May 19, 2017.
Krähenbühl, Philipp, and Vladlen Koltun. "Efficient inference in fully connected crfs with gaussian edge potentials." *Advances in neural information processing systems* 24 (2011): 109-117.
Lafferty, John, Andrew McCallum, and Fernando CN Pereira. "Conditional random fields: Probabilistic models for segmenting and labeling sequence data." (2001).
LeCun, Yann, Bernhard Boser, John S. Denker, Donnie Henderson, Richard E. Howard, Wayne Hubbard, and Lawrence D. Jackel. "Backpropagation applied to handwritten zip code recognition." *Neural computation* 1, No. 4 (1989): 541-551, 1989.
Lin, Tsung-Yi, Piotr Dollár, Ross Girshick, Kaiming He, Bharath Hariharan, and Serge Belongie. "Feature pyramid networks for object detection." in *Proceedings of the IEEE conference on computer vision and pattern recognition*, pp. 2117-2125. 2017.
Lin, Tsung-Yi, Michael Maire, Serge Belongie, James Hays, Pietro Perona, Deva Ramanan, Piotr Dollár, and C. Lawrence Zitnick. "Microsoft coco: Common objects in context." in *European conference on computer vision*, pp. 740-755. Springer, Cham, Sep. 6, 2014.
Nair, Vinod, and Geoffrey E. Hinton. "Rectified linear units improve restricted boltzmann machines." in *ICML*, Jan. 1, 2010.
Oord, Aaron van den, Sander Dieleman, Heiga Zen, Karen Simonyan, Oriol Vinyals, Alex Graves, Nal Kalchbrenner, Andrew Senior, and Koray Kavukcuoglu. "Wavenet: A generative model for raw audio." *arXiv preprint arXiv:1609.03499* (2016), Sep. 12, 2012.
Ren, Shaoqing, Kaiming He, Ross Girshick, and Jian Sun. "Faster r-cnn: Towards real-time object detection with region proposal networks." *IEEE transactions on pattern analysis and machine intelligence* 39, No. 6 (2016): 1137-1149, Jun. 6, 2016.
Rumelhart, David E., Geoffrey E. Hinton, and Ronald J. Williams. "Learning representations by back-propagating errors." *nature* 323, No. 6088 (1986): 533-536, Oct. 3, 1986.
Russakovsky, Olga, Jia Deng, Hao Su, Jonathan Krause, Sanjeev Satheesh, Sean Ma, Zhiheng Huang et al. "Imagenet large scale visual recognition challenge." *International journal of computer vision* 115, No. 3 (2015): 211-252, Dec. 1, 2015.
Santoro, Adam, David Raposo, David G. Barrett, Mateusz Malinowski, Razvan Pascanu, Peter Battaglia, and Timothy Lillicrap. "A simple neural network module for relational reasoning." in *Advances in neural information processing systems*, pp. 4967-4976. 2017.
Sigurdsson, Gunnar A., Santosh Divvala, Ali Farhadi, and Abhinav Gupta. "Asynchronous temporal fields for action recognition." in *Proceedings of the IEEE Conference on Computer Vision and Pattern Recognition*, pp. 585-594. 2017.

(56) References Cited

OTHER PUBLICATIONS

Sigurdsson, Gunnar A., Gül Varol, Xiaolong Wang, Ali Farhadi, Ivan Laptev, and Ahhinav Gupta. "Hollywood in homes: Crowdsourcing data collection for activity understanding." in *European Conference on Computer Vision*, pp. 510-526. Springer, Cham, Oct. 8, 2016.

Simonyan, Karen, and Andrew Zisserman. "Two-stream convolutional networks for action recognition in videos." *Advances in neural information processing systems* 27 (2014): 568-576. 2014.

Simonyan, Karen, and Andrew Zisserman. "Very deep convolutional networks for large-scale image recognition." *arXiv preprint arXiv:1409.1556* (2014).

Tomasi, Carlo, and Roberto Manduchi. "Bilateral filtering for gray and color images." in *Sixth international conference on computer vision* (IEEE Cat. No. 98CH36271), pp. 839-846. IEEE, Jan. 7, 1998.

Tran, Du, Lubomir Bourdev, Rob Fergus, Lorenzo Torresani, and Manohar Paluri. "Learning spatiotemporal features with 3d convolutional networks." in *Proceedings of the IEEE international conference on computer vision*, pp. 4489-4497. 2015.

Vaswani, Ashish, Noam Shazeer, Niki Parmar, Jakob Uszkoreit, Llion Jones, Aidan N. Gomez, Łukasz Kaiser, and Illia Polosukhin. "Attention is all you need." in *Advances in neural information processing systems*, pp. 5998-6008. 2017.

Wang, Heng, and Cordelia Schmid. "Action recognition with improved trajectories." in *Proceedings of the IEEE international conference on computer vision*, pp. 3551-3558. 2013.

Wang, Limin, Yu Qiao, and Xiaoou Tang. "Action recognition with trajectory-pooled deep-convolutional descriptors." in *Proceedings of IEEE conference on computer vision and pattern recognition*, pp. 4305-4314. 2015.

Xie, Saining, Ross Girshick, Piotr Dollár, Zhuowen Tu, and Kaiming He. "Aggregated residual transformations for deep neural networks." in *Proceedings of the IEEE conference on computer vision and pattern recognition*, pp. 1492-1500. 2017.

Xiong, W., J. Droppo, X. Huang, F. Seide, M. Seltzer, A. Stolcke, D. Yu, and G. Zweig. "The Microsoft 2016 Conversational Speech Recognition System." 2016.

Ng, Yue-Hei. "Joe and Hausknecht, Matthew and Vijayanarasimhan, Sudheendra and Vinyals, Oriol and Monga, Rajat and Toderici, George, Beyond short snippets: Deep networks for video classification." in *Proceedings of the IEEE conference on computer vision and pattern recognition*, pp. 4694-4702. 2015.

Zheng, Shuai, Sadeep Jayasumana, Bernardino Romera-Paredes, Vibhav Vineet, Zhizhong Su, Dalong Du, Chang Huang, and Philip HS Torr. "Conditional random fields as recurrent neural networks." in *Proceedings of the IEEE international conference on computer vision*, pp. 1529-1537. 2015.

EESR received from EPO for EP Patent Application No. EP18879253. 5, dated Dec. 14, 2020.

Yin, et al., Attentive Convolution: Equipping CNNs with RNN-style Attention Mechanisms, Center for Information and Language Processing, LMU Munich, Germany, pp. 1-12, Oct. 2, 2017.

Osadchy, et al., No Bot Expects the DeepCAPTCHA! Introducing Immutable Adversarial Examples, With Applications to CAPTCHA Generation, IEEE Transactions on Information Forensics and Security, IEEE, Piscataway, NJ, US, vol. 12, No. 11, pp. 2640-2653, XP011660597, Nov. 2017.

Buades et al., A Non-Local Algorithm for Image Denoising, UIB, Spain, pp. 1-6.

Wang, et al., Fast 3D Non-Local Denoising Algorithm for Video Image Using Inter-Frames Dependency, 2013 Ninth International Conference on Natural Computation (ICNC), IEEE, pp. 1334-1338, XP032596547, 2013.

\* cited by examiner

MACHINE-LEARNING MODELS BASED ON NON-LOCAL NEURAL NETWORKS

PRIORITY

This application claims the benefit, under 35 U.S.C. § 119(e), of U.S. Provisional Patent Application No. 62/587,884, filed 17 Nov. 2017, which is incorporated herein by reference.

TECHNICAL FIELD

This disclosure generally relates to image and video analysis using machine learning within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. profile/news feed posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the assistant system may assist a user to obtain information or services. The assistant system may enable the user to interact with it with multi-modal user input (such as voice, text, image, video) in stateful and multi-turn conversations to get assistance. The assistant system may create and store a user profile comprising both personal and contextual information associated with the user. In particular embodiments, the assistant system may analyze the user input using natural-language understanding. The analysis may be based on the user profile for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation. Through the interaction with the user, the assistant system may use dialog management techniques to manage and forward the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute tasks that are relevant to user interests and preferences based on the user profile without a user input. In particular embodiments, the assistant system may check privacy settings to ensure that accessing a user's profile or other user information and executing different tasks are permitted subject to the user's privacy settings.

In particular embodiments, the assistant system may use one or more non-local machine-learning models to analyze content objects comprising one or more of speech, text, image, video, or a combination of them. The non-local machine-learning models may be based on deep neural networks. In deep neural networks, both convolutional and recurrent operations may be building blocks that process one local neighborhood at a time. In particular embodiments, the non-local machine-learning models may use non-local operations as a generic family of building blocks for capturing long-range dependencies. The non-local machine-learning models may use non-local operations to compute the response at a position as a weighted sum of the features at all positions. The building block may be plugged into a plurality of computer vision architectures. In particular embodiments, the non-local machine-learning models may be applied to the task of video classification. As an example and not by way of limitation, the non-local machine-learning models can compete or outperform current competition winners on both Kinetics and Charades datasets (i.e., two public datasets) even without any bells and whistles. In particular embodiments, the non-local machine-learning models may be also applied to static image recognition. As an example and not by way of limitation, the non-local machine-learning models improve object detection/segmentation and pose estimation on the COCO (i.e., a public dataset) suite of tasks. Although this disclosure describes particular machine-learning models based on particular building blocks in particular manners, this disclosure contemplates any suitable machine-learning models based on any suitable building blocks in any suitable manner.

In particular embodiments, the assistant system may train a baseline machine-learning model based on a neural network comprising a plurality of stages. Each stage may comprise a plurality of neural blocks. The assistant system may then access a plurality of training samples comprising a plurality of content objects, respectively. In particular embodiments, the assistant system may determine one or more non-local operations. Each non-local operation may be based on one or more pairwise functions and one or more unary functions. In particular embodiments, the assistant system may generate one or more non-local blocks based on the plurality of training samples and the one or more non-local operations. The assistant system may then determine a stage from the plurality of stages of the neural network. In particular embodiments, the assistant system may further train a non-local machine-learning model by inserting each of the one or more non-local blocks in between at least two of the plurality of neural blocks in the determined stage of the neural network.

Certain embodiments disclosed herein may provide one or more technical advantages. A technical advantage of the embodiments may include directly capturing long-range dependencies with deep neural networks by using non-local operations to compute interactions between any two positions, regardless of their positional distance. Another technical advantage of the embodiments may include achieving the best results by using non-local operations even with only a few layers in a deep neural network. Another technical advantage of the embodiments may include maintaining the variable input sizes via non-local operations and easily combining non-local operations with other operations (e.g., convolutions). Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
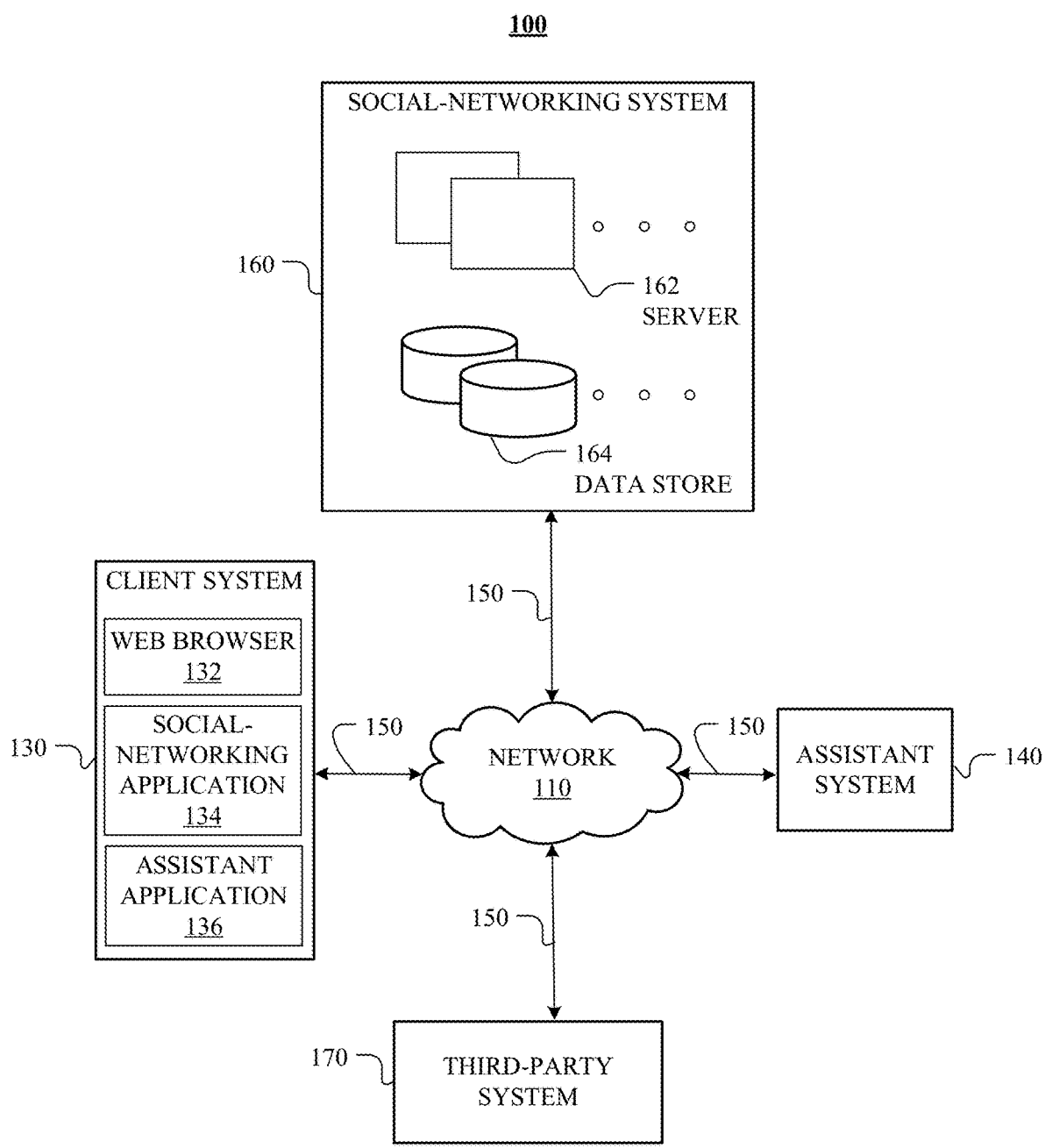
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system 130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. Patent Application No. 62/655,751, filed 10 Apr. 2018, U.S. patent application Ser. No. 29/631,910, filed 3 Jan. 2018, U.S. patent application Ser. No. 29/631,747, filed 2 Jan. 2018, U.S. patent application Ser. No. 29/631,913, filed 3 Jan. 2018, and U.S. patent application Ser. No. 29/631,914, filed 3 Jan. 2018, which are incorporated by reference. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be accessed via the web browser 132. In particular embodiments, the user may provide input via different modalities. As an example and not by way of limitation, the modalities may include audio, text, image, video, etc. The assistant application 136 may communicate the user input to the assistant system 140. Based on the user input, the assistant system 140 may generate responses. The assistant system 140 may send the generated responses to the assistant application 136. The assistant application 136 may then present the responses to the user at the client system 130. The presented responses may be based on different modalities such as audio, text, image, and video. As an example and not by way of limitation, the user may verbally ask the assistant application 136 about the traffic information (i.e., via an audio modality). The assistant application 136 may then communicate the request to the assistant system 140. The assistant system 140 may accordingly generate the result and send it back to the assistant application 136. The assistant application 136 may further present the result to the user in text.

In particular embodiments, an assistant system 140 may assist users to retrieve information from different sources. The assistant system 140 may also assist user to request services from different service providers. In particular embodiments, the assist system 140 may receive a user request for information or services via the assistant application 136 in the client system 130. The assist system 140 may use natural-language understanding to analyze the user request based on user's profile and other relevant information. The result of the analysis may comprise different entities associated with an online social network. The assistant system 140 may then retrieve information or request services associated with these entities. In particular embodiments, the assistant system 140 may interact with the social-networking system 160 and/or third-party system 170 when retrieving information or requesting services for the user. In particular embodiments, the assistant system 140 may generate a personalized communication content for the user using natural-language generating techniques. The personalized communication content may comprise, for example, the retrieved information or the status of the requested services. In particular embodiments, the assistant system 140 may enable the user to interact with it regarding the information or services in a stateful and multi-turn conversation by using dialog-management techniques. The functionality of the assistant system 140 is described in more detail in the discussion of FIG. 2 below.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
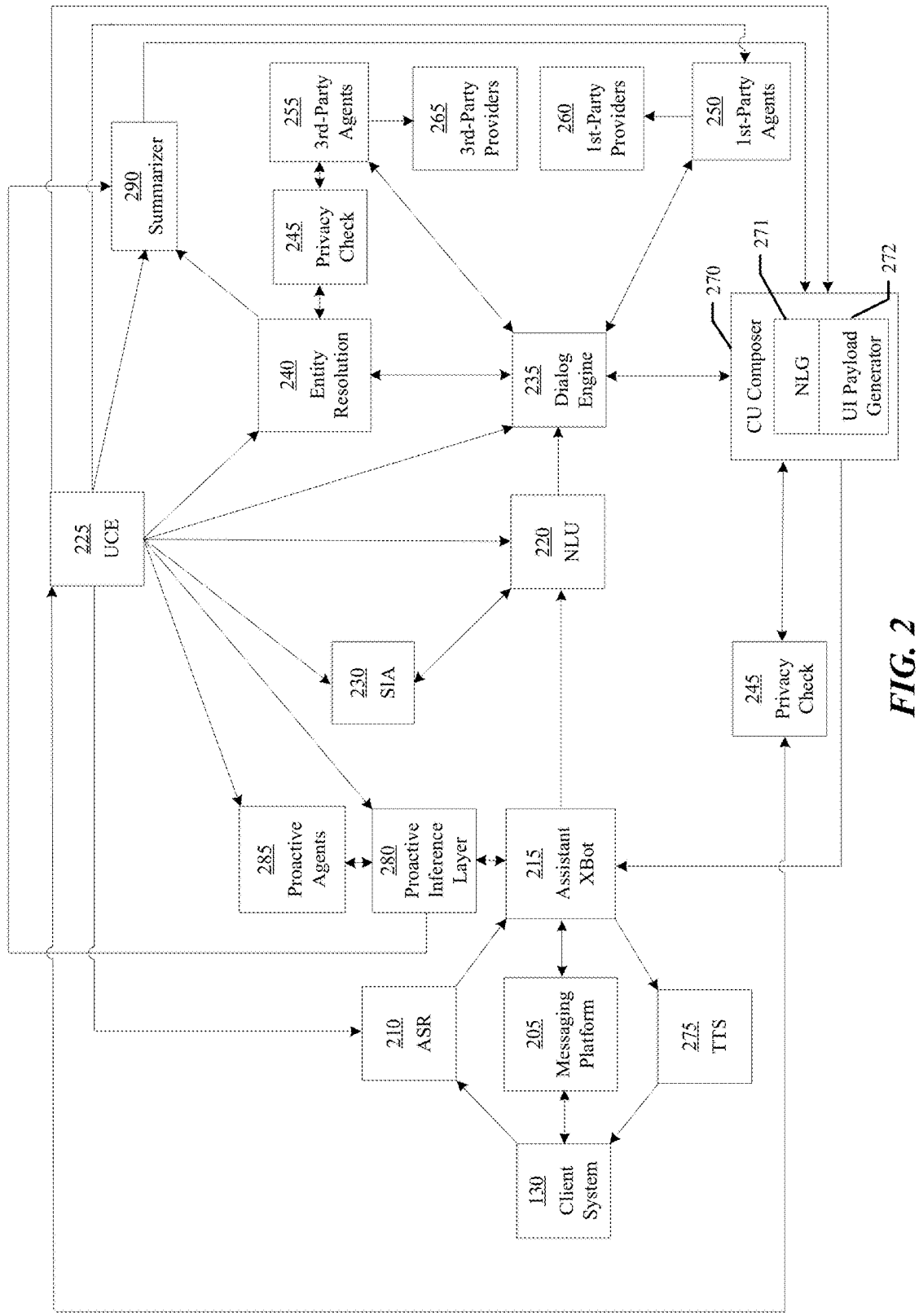
FIG. 2 illustrates an example architecture of the assistant system.

FIG. 2 illustrates an example architecture of the assistant system 140. In particular embodiments, the assistant system 140 may assist a user to obtain information or services. The assistant system 140 may enable the user to interact with it with multi-modal user input (such as voice, text, image, video) in stateful and multi-turn conversations to get assistance. The assistant system 140 may create and store a user profile comprising both personal and contextual information associated with the user. In particular embodiments, the assistant system 140 may analyze the user input using natural-language understanding. The analysis may be based on the user profile for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation. Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute pre-authorized tasks that are relevant to user interests and preferences based on the user profile, at a time relevant for the user, without a user input. In particular embodiments, the assistant system 140 may check privacy settings to ensure that accessing a user's profile or other user information and executing different tasks are permitted subject to the user's privacy settings. More information on assisting users subject to privacy settings may be found in U.S. Patent Application No. 62/675,090, filed 22 May 2018, which is incorporated by reference.

In particular embodiments, the assistant system 140 may receive a user input from the assistant application 136 in the client system 130 associated with the user. In particular embodiments, the user input may be a user generated input that is sent to the assistant system 140 in a single turn. If the user input is based on a text modality, the assistant system 140 may receive it at a messaging platform 205. If the user input is based on an audio modality (e.g., the user may speak to the assistant application 136 or send a video including speech to the assistant application 136), the assistant system 140 may process it using an audio speech recognition (ASR) module 210 to convert the user input into text. If the user input is based on an image or video modality, the assistant system 140 may process it using optical character recognition techniques within the messaging platform 205 to convert the user input into text. The output of the messaging platform 205 or the ASR module 210 may be received at an assistant xbot 215. More information on handling user input based on different modalities may be found in U.S. patent application Ser. No. 16/053,600, filed 2 Aug. 2018, which is incorporated by reference.

In particular embodiments, the assistant xbot 215 may be a type of chat bot. The assistant xbot 215 may comprise a programmable service channel, which may be a software code, logic, or routine that functions as a personal assistant to the user. The assistant xbot 215 may work as the user's portal to the assistant system 140. The assistant xbot 215 may therefore be considered as a type of conversational agent. In particular embodiments, the assistant xbot 215 may send the textual user input to a natural-language understanding (NLU) module 220 to interpret the user input. In particular embodiments, the NLU module 220 may get information from a user context engine 225 and a semantic information aggregator 230 to accurately understand the user input. The user context engine 225 may store the user profile of the user. The user profile of the user may comprise user-profile data including demographic information, social information, and contextual information associated with the user. The user-profile data may also include user interests and preferences on a plurality of topics, aggregated through conversations on news feed, search logs, messaging platform 205, etc. The usage of a user profile may be protected behind a privacy check module 245 to ensure that a user's information can be used only for his/her benefit, and not shared with anyone else. More information on user profiles may be found in U.S. patent application Ser. No. 15/967,239, filed 30 Apr. 2018, which is incorporated by reference. The semantic information aggregator 230 may provide ontology data associated with a plurality of predefined domains, intents, and slots to the NLU module 220. In particular embodiments, a domain may denote a social context of interaction, e.g., education. An intent may be an element in a pre-defined taxonomy of semantic intentions, which may indicate a purpose of a user interacting with the assistant system 140. In particular embodiments, an intent may be an output of the NLU module 220 if the user input comprises a text/speech input. The NLU module 220 may classify the text/speech input into a member of the pre-defined taxonomy, e.g., for the input "Play Beethoven's 5th," the NLU module 220 may classify the input as having the intent [intent:play_music]. In particular embodiments, a domain may be conceptually a namespace for a set of intents, e.g., music. A slot may be a named sub-string with the user input, representing a basic semantic entity. For example, a slot for "pizza" may be [slot:dish]. In particular embodiments, a set of valid or expected named slots may be conditioned on the classified intent. As an example and not by way of limitation, for [intent:play_music], a slot may be [slot:song_name]. The semantic information aggregator 230 may additionally extract information from a social graph, a knowledge graph, and a concept graph, and retrieve a user's profile from the user context engine 225. The semantic information aggregator 230 may further process information from these different sources by determining what information to aggregate, annotating n-grams of the user input, ranking the n-grams with confidence scores based on the aggregated information, formulating the ranked n-grams into features that can be used by the NLU module 220 for understanding the user input. More information on aggregating semantic information may be found in U.S. patent application Ser. No. 15/967,342, filed 30 Apr. 2018, which is incorporated by reference. Based on the output of the user context engine 225 and the semantic information aggregator 230, the NLU module 220 may identify a domain, an intent, and one or more slots from the user input in a personalized and context-aware manner. As an example and not by way of limitation, a user input may comprise "show me how to get to the Starbucks". The NLU module 220 may identify the particular Starbucks that the user wants to go based on the user's personal information and the associated contextual information. In particular embodiments, the NLU module 220 may comprise a lexicon of language and a parser and grammar rules to partition sentences into an internal representation. The NLU module 220 may also comprise one or more programs that perform naive semantics or stochastic semantic analysis to the use of pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm. More information on natural-language understanding may be found in U.S. patent application Ser. No. 16/011,062, filed 18 Jun. 2018, U.S. patent application Ser. No. 16/025,317, filed 2 Jul. 2018, and U.S. patent application Ser. No. 16/038,120, filed 17 Jul. 2018, each of which is incorporated by reference.

In particular embodiments, the identified domain, intent, and one or more slots from the NLU module 220 may be sent to a dialog engine 235. In particular embodiments, the dialog engine 235 may manage the dialog state and flow of the conversation between the user and the assistant xbot 215. The dialog engine 235 may additionally store previous conversations between the user and the assistant xbot 215. In particular embodiments, the dialog engine 235 may communicate with an entity resolution module 240 to resolve entities associated with the one or more slots, which supports the dialog engine 235 to forward the flow of the conversation between the user and the assistant xbot 215. In particular embodiments, the entity resolution module 240 may access the social graph, the knowledge graph, and the concept graph when resolving the entities. Entities may include, for example, unique users or concepts, each of which may have a unique identifier (ID). As an example and not by way of limitation, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability. A confidence probability for an attribute value represents a probability that the value is accurate for the given attribute. Each attribute value may be also associated with a semantic weight. A semantic weight for an attribute value may represent how the value semantically appropriate for the given attribute considering all the available information. For example, the knowledge graph may comprise an entity of a movie "The Martian" (2015), which includes information that has been extracted from multiple content sources (e.g., Facebook, Wikipedia, movie review sources, media databases, and entertainment content sources), and then deduped, resolved, and fused to generate the single unique record for the knowledge graph. The entity may be associated with a space attribute value which indicates the genre of the movie "The Martian" (2015). More information on the knowledge graph may be found in U.S. patent application Ser. No. 16/048,049, filed 27 Jul. 2018, and U.S. patent application Ser. No. 16/048,101, filed 27 Jul. 2018, each of which is incorporated by reference. The entity resolution module 240 may additionally request a user profile of the user associated with the user input from the user context engine 225. In particular embodiments, the entity resolution module 240 may communicate with a privacy check module 245 to guarantee that the resolving of the entities does not violate privacy policies. In particular embodiments, the privacy check module 245 may use an authorization/privacy server to enforce privacy policies. As an example and not by way of limitation, an entity to be resolved may be another user who specifies in his/her privacy settings that his/her identity should not be searchable on the online social network, and thus the entity resolution module 240 may not return that user's identifier in response to a request. Based on the information obtained from the social graph, knowledge graph, concept graph, and user profile, and subject to applicable privacy policies, the entity resolution module 240 may therefore accurately resolve the entities associated with the user input in a personalized and context-aware manner. In particular embodiments, each of the resolved entities may be associated with one or more identifiers hosted by the social-networking system 160. As an example and not by way of limitation, an identifier may comprise a unique user identifier (ID). In particular embodiments, each of the resolved entities may be also associated with a confidence score. More information on resolving entities may be found in U.S. patent application Ser. No. 16/048,049, filed 27 Jul. 2018, and U.S. patent application Ser. No. 16/048,072, filed 27 Jul. 2018, each of which is incorporated by reference.

In particular embodiments, the dialog engine 235 may communicate with different agents based on the identified intent and domain, and the resolved entities. In particular embodiments, an agent may be an implementation that serves as a broker across a plurality of content providers for one domain. A content provider may be an entity responsible for carrying out an action associated with an intent or completing a task associated with the intent. As an example and not by way of limitation, multiple device-specific implementations (e.g., real-time calls for a client system 130 or a messaging application on the client system 130) may be handled internally by a single agent. Alternatively, these device-specific implementations may be handled by multiple agents associated with multiple domains. In particular embodiments, the agents may comprise first-party agents 250 and third-party agents 255. In particular embodiments, first-party agents 250 may comprise internal agents that are accessible and controllable by the assistant system 140 (e.g. agents associated with services provided by the online social network (Messenger, Instagram)). In particular embodiments, third-party agents 255 may comprise external agents that the assistant system 140 has no control over (e.g., music streams agents (Spotify), ticket sales agents (Ticketmaster)). The first-party agents 250 may be associated with first-party providers 260 that provide content objects and/or services hosted by the social-networking system 160. The third-party agents 255 may be associated with third-party providers 265 that provide content objects and/or services hosted by the third-party system 170.

In particular embodiments, the communication from the dialog engine 235 to the first-party agents 250 may comprise requesting particular content objects and/or services provided by the first-party providers 260. As a result, the first-party agents 250 may retrieve the requested content objects from the first-party providers 260 and/or execute tasks that command the first-party providers 260 to perform the requested services. In particular embodiments, the communication from the dialog engine 235 to the third-party agents 255 may comprise requesting particular content objects and/or services provided by the third-party providers 265. As a result, the third-party agents 255 may retrieve the requested content objects from the third-party providers 265 and/or execute tasks that command the third-party providers 265 to perform the requested services. The third-party agents 255 may access the privacy check module 245 to guarantee no privacy violations before interacting with the third-party providers 265. As an example and not by way of limitation, the user associated with the user input may specify in his/her privacy settings that his/her profile information is invisible to any third-party content providers. Therefore, when retrieving content objects associated with the user input from the third-party providers 265, the third-party agents 255 may complete the retrieval without revealing to the third-party providers 265 which user is requesting the content objects.

In particular embodiments, each of the first-party agents 250 or third-party agents 255 may be designated for a particular domain. As an example and not by way of limitation, the domain may comprise weather, transportation, music, etc. In particular embodiments, the assistant system 140 may use a plurality of agents collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, each of the first-party agents 250 or third-party agents 255 may retrieve a user profile from the user context engine 225 to execute tasks in a personalized and context-aware manner. As an example and not by way of limitation, a user input may comprise "book me a ride to the airport." A transportation agent may execute the task of booking the ride. The transportation agent may retrieve the user profile of the user from the user context engine 225 before booking the ride. For example, the user profile may indicate that the user prefers taxis, so the transportation agent may book a taxi for the user. As another example, the contextual information associated with the user profile may indicate that the user is in a hurry so the transportation agent may book a ride from a ride-sharing service (e.g., Uber, Lyft) for the user since it may be faster to get a car from a ride-sharing service than a taxi company. In particular embodiment, each of the first-party agents 250 or third-party agents 255 may take into account other factors when executing tasks. As an example and not by way of limitation, other factors may comprise price, rating, efficiency, partnerships with the online social network, etc.

In particular embodiments, the dialog engine 235 may communicate with a conversational understanding composer (CU composer) 270. The dialog engine 235 may send the requested content objects and/or the statuses of the requested services to the CU composer 270. In particular embodiments, the dialog engine 235 may send the requested content objects and/or the statuses of the requested services as a <k, c, u, d> tuple, in which k indicates a knowledge source, c indicates a communicative goal, u indicates a user model, and d indicates a discourse model. In particular embodiments, the CU composer 270 may comprise a natural-language generator (NLG) 271 and a user interface (UI) payload generator 272. The natural-language generator 271 may generate a communication content based on the output of the dialog engine 235. In particular embodiments, the NLG 271 may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator 271 to build complex concepts/roles from atomic ones. In particular embodiments, the content determination component may perform the following tasks to determine the communication content. The first task may comprise a translation task, in which the input to the natural-language generator 271 may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the natural-language generator 271. The sentence planner may determine the organization of the communication content to make it human understandable. The surface realization component may determine specific words to use, the sequence of the sentences, and the style of the communication content. The UI payload generator 272 may determine a preferred modality of the communication content to be presented to the user. In particular embodiments, the CU composer 270 may communicate with the privacy check module 245 to make sure the generation of the communication content follows the privacy policies. In particular embodiments, the CU composer 270 may retrieve a user profile from the user context engine 225 when generating the communication content and determining the modality of the communication content. As a result, the communication content may be more natural, personalized, and context-aware for the user. As an example and not by way of limitation, the user profile may indicate that the user likes short sentences in conversations so the generated communication content may be based on short sentences. As another example and not by way of limitation, the contextual information associated with the user profile may indicated that the user is using a device that only outputs audio signals so the UI payload generator 272 may determine the modality of the communication content as audio. More information on natural-language generation may be found in U.S. patent application Ser. No. 15/967,279, filed 30 Apr. 2018, and U.S. patent application Ser. No. 15/966,455, filed 30 Apr. 2018, each of which is incorporated by reference.

In particular embodiments, the CU composer 270 may send the generated communication content to the assistant xbot 215. In particular embodiments, the assistant xbot 215 may send the communication content to the messaging platform 205. The messaging platform 205 may further send the communication content to the client system 130 via the assistant application 136. In alternative embodiments, the assistant xbot 215 may send the communication content to a text-to-speech (TTS) module 275. The TTS module 275 may convert the communication content to an audio clip. The TTS module 275 may further send the audio clip to the client system 130 via the assistant application 136.

In particular embodiments, the assistant xbot 215 may interact with a proactive inference layer 280 without receiving a user input. The proactive inference layer 280 may infer user interests and preferences based on the user profile that is retrieved from the user context engine 225. In particular embodiments, the proactive inference layer 280 may further communicate with proactive agents 285 regarding the inference. The proactive agents 285 may execute proactive tasks based on the inference. As an example and not by way of limitation, the proactive tasks may comprise sending content objects or providing services to the user. In particular embodiments, each proactive task may be associated with an agenda item. The agenda item may comprise a recurring item such as a daily digest. The agenda item may also comprise a one-time item. In particular embodiments, a proactive agent 285 may retrieve the user profile from the user context engine 225 when executing the proactive task. Therefore, the proactive agent 285 may execute the proactive task in a personalized and context-aware manner. As an example and not by way of limitation, the proactive inference layer may infer that the user likes the band Maroon 5 and the proactive agent 285 may generate a recommendation of Maroon 5's new song/album to the user.

In particular embodiments, the proactive agent 285 may generate candidate entities associated with the proactive task based on a user profile. The generation may be based on a straightforward backend query using deterministic filters to retrieve the candidate entities from a structured data store. The generation may be alternatively based on a machine-learning model that is trained based on the user profile, entity attributes, and relevance between users and entities. As an example and not by way of limitation, the machine-learning model may be based on support vector machines (SVM). As another example and not by way of limitation, the machine-learning model may be based on a regression model. As another example and not by way of limitation, the machine-learning model may be based on a deep convolutional neural network (DCNN). In particular embodiments, the proactive agent 285 may also rank the generated candidate entities based on the user profile and the content associated with the candidate entities. The ranking may be based on the similarities between a user's interests and the candidate entities. As an example and not by way of limitation, the assistant system 140 may generate a feature vector representing a user's interest and feature vectors representing the candidate entities. The assistant system 140 may then calculate similarity scores (e.g., based on cosine similarity) between the feature vector representing the user's interest and the feature vectors representing the candidate entities. The ranking may be alternatively based on a ranking model that is trained based on user feedback data.

In particular embodiments, the proactive task may comprise recommending the candidate entities to a user. The proactive agent 285 may schedule the recommendation, thereby associating a recommendation time with the recommended candidate entities. The recommended candidate entities may be also associated with a priority and an expiration time. In particular embodiments, the recommended candidate entities may be sent to a proactive scheduler. The proactive scheduler may determine an actual time to send the recommended candidate entities to the user based on the priority associated with the task and other relevant factors (e.g., clicks and impressions of the recommended candidate entities). In particular embodiments, the proactive scheduler may then send the recommended candidate entities with the determined actual time to an asynchronous tier. The asynchronous tier may temporarily store the recommended candidate entities as a job. In particular embodiments, the asynchronous tier may send the job to the dialog engine 235 at the determined actual time for execution. In alternative embodiments, the asynchronous tier may execute the job by sending it to other surfaces (e.g., other notification services associated with the social-networking system 160). In particular embodiments, the dialog engine 235 may identify the dialog intent, state, and history associated with the user. Based on the dialog intent, the dialog engine 235 may select some candidate entities among the recommended candidate entities to send to the client system 130. In particular embodiments, the dialog state and history may indicate if the user is engaged in an ongoing conversation with the assistant xbot 215. If the user is engaged in an ongoing conversation and the priority of the task of recommendation is low, the dialog engine 235 may communicate with the proactive scheduler to reschedule a time to send the selected candidate entities to the client system 130. If the user is engaged in an ongoing conversation and the priority of the task of recommendation is high, the dialog engine 235 may initiate a new dialog session with the user in which the selected candidate entities may be presented. As a result, the interruption of the ongoing conversation may be prevented. When it is determined that sending the selected candidate entities is not interruptive to the user, the dialog engine 235 may send the selected candidate entities to the CU composer 270 to generate a personalized and context-aware communication content comprising the selected candidate entities, subject to the user's privacy settings. In particular embodiments, the CU composer 270 may send the communication content to the assistant xbot 215 which may then send it to the client system 130 via the messaging platform 205 or the TTS module 275. More information on proactively assisting users may be found in U.S. patent application Ser. No. 15/967,193, filed 30 Apr. 2018, and U.S. patent application Ser. No. 16/036,827, filed 16 Jul. 2018, each of which is incorporated by reference.

In particular embodiments, the assistant xbot 215 may communicate with a proactive agent 285 in response to a user input. As an example and not by way of limitation, the user may ask the assistant xbot 215 to set up a reminder. The assistant xbot 215 may request a proactive agent 285 to set up such reminder and the proactive agent 285 may proactively execute the task of reminding the user at a later time.

In particular embodiments, the assistant system 140 may comprise a summarizer 290. The summarizer 290 may provide customized news feed summaries to a user. In particular embodiments, the summarizer 290 may comprise a plurality of meta agents. The plurality of meta agents may use the first-party agents 250, third-party agents 255, or proactive agents 285 to generated news feed summaries. In particular embodiments, the summarizer 290 may retrieve user interests and preferences from the proactive inference layer 280. The summarizer 290 may then retrieve entities associated with the user interests and preferences from the entity resolution module 240. The summarizer 290 may further retrieve a user profile from the user context engine 225. Based on the information from the proactive inference layer 280, the entity resolution module 240, and the user context engine 225, the summarizer 290 may generate personalized and context-aware summaries for the user. In particular embodiments, the summarizer 290 may send the summaries to the CU composer 270. The CU composer 270 may process the summaries and send the processing results to the assistant xbot 215. The assistant xbot 215 may then send the processed summaries to the client system 130 via the messaging platform 205 or the TTS module 275. More information on summarization may be found in U.S. patent application Ser. No. 15/967,290, filed 30 Apr. 2018, which is incorporated by reference.

Figure 3:
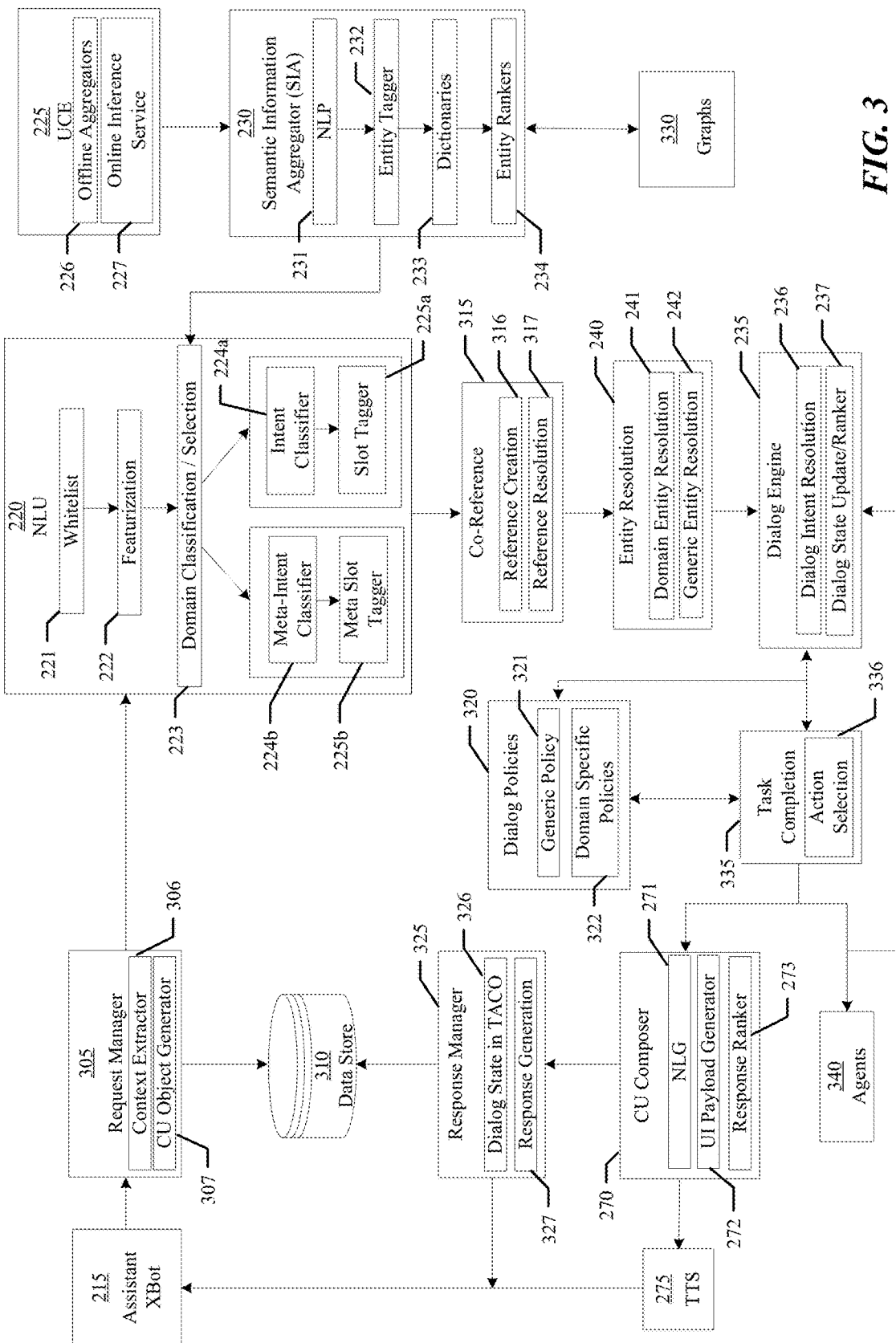
FIG. 3 illustrates an example diagram flow of responding to a user request by the assistant system.

FIG. 3 illustrates an example diagram flow of responding to a user request by the assistant system 140. In particular embodiments, the assistant xbot 215 may access a request manager 305 upon receiving the user request. The request manager 305 may comprise a context extractor 306 and a conversational understanding object generator (CU object generator) 307. The context extractor 306 may extract contextual information associated with the user request. The context extractor 306 may also update contextual information based on the assistant application 136 executing on the client system 130. As an example and not by way of limitation, the update of contextual information may comprise content items are displayed on the client system 130. As another example and not by way of limitation, the update of contextual information may comprise alarm is set on the client system 130. As another example and not by way of limitation, the update of contextual information may comprise a song is playing on the client system 130. The CU object generator 307 may generate particular content objects relevant to the user request. The content objects may comprise dialog-session data and features associated with the user request, which may be shared with all the modules of the assistant system 140. In particular embodiments, the request manager 305 may store the contextual information and the generated content objects in data store 310 which is a particular data store implemented in the assistant system 140.

In particular embodiments, the request manger 305 may send the generated content objects to the NLU module 220. The NLU module 220 may perform a plurality of steps to process the content objects. At step 221, the NLU module 220 may generate a whitelist for the content objects. In particular embodiments, the whitelist may comprise interpretation data matching the user request. At step 222, the NLU module 220 may perform a featurization based on the whitelist. At step 223, the NLU module 220 may perform domain classification/selection on user request based on the features resulted from the featurization to classify the user request into predefined domains. The domain classification/selection results may be further processed based on two related procedures. At step 224a, the NLU module 220 may process the domain classification/selection result using an intent classifier. The intent classifier may determine the user's intent associated with the user request. In particular embodiments, there may be one intent classifier for each domain to determine the most possible intents in a given domain. As an example and not by way of limitation, the intent classifier may be based on a machine-learning model that may take the domain classification/selection result as input and calculate a probability of the input being associated with a particular predefined intent. At step 224b, the NLU module may process the domain classification/selection result using a meta-intent classifier. The meta-intent classifier may determine categories that describe the user's intent. In particular embodiments, intents that are common to multiple domains may be processed by the meta-intent classifier. As an example and not by way of limitation, the meta-intent classifier may be based on a machine-learning model that may take the domain classification/selection result as input and calculate a probability of the input being associated with a particular predefined meta-intent. At step 225a, the NLU module 220 may use a slot tagger to annotate one or more slots associated with the user request. In particular embodiments, the slot tagger may annotate the one or more slots for the n-grams of the user request. At step 225b, the NLU module 220 may use a meta slot tagger to annotate one or more slots for the classification result from the meta-intent classifier. In particular embodiments, the meta slot tagger may tag generic slots such as references to items (e.g., the first), the type of slot, the value of the slot, etc. As an example and not by way of limitation, a user request may comprise "change 500 dollars in my account to Japanese yen." The intent classifier may take the user request as input and formulate it into a vector. The intent classifier may then calculate probabilities of the user request being associated with different predefined intents based on a vector comparison between the vector representing the user request and the vectors representing different predefined intents. In a similar manner, the slot tagger may take the user request as input and formulate each word into a vector. The intent classifier may then calculate probabilities of each word being associated with different predefined slots based on a vector comparison between the vector representing the word and the vectors representing different predefined slots. The intent of the user may be classified as "changing money". The slots of the user request may comprise "500", "dollars", "account", and "Japanese yen". The meta-intent of the user may be classified as "financial service". The meta slot may comprise "finance".

In particular embodiments, the NLU module 220 may improve the domain classification/selection of the content objects by extracting semantic information from the semantic information aggregator 230. In particular embodiments, the semantic information aggregator 230 may aggregate semantic information in the following way. The semantic information aggregator 230 may first retrieve information from the user context engine 225. In particular embodiments, the user context engine 225 may comprise offline aggregators 226 and an online inference service 227. The offline aggregators 226 may process a plurality of data associated with the user that are collected from a prior time window. As an example and not by way of limitation, the data may include news feed posts/comments, interactions with news feed posts/comments, Instagram posts/comments, search history, etc. that are collected from a prior 90-day window. The processing result may be stored in the user context engine 225 as part of the user profile. The online inference service 227 may analyze the conversational data associated with the user that are received by the assistant system 140 at a current time. The analysis result may be stored in the user context engine 225 also as part of the user profile. In particular embodiments, both the offline aggregators 226 and online inference service 227 may extract personalization features from the plurality of data. The extracted personalization features may be used by other modules of the assistant system 140 to better understand user input. In particular embodiments, the semantic information aggregator 230 may then process the retrieved information, i.e., a user profile, from the user context engine 225 in the following steps. At step 231, the semantic information aggregator 230 may process the retrieved information from the user context engine 225 based on natural-language processing (NLP). In particular embodiments, the semantic information aggregator 230 may tokenize text by text normalization, extract syntax features from text, and extract semantic features from text based on NLP. The semantic information aggregator 230 may additionally extract features from contextual information, which is accessed from dialog history between a user and the assistant system 140. The semantic information aggregator 230 may further conduct global word embedding, domain-specific embedding, and/or dynamic embedding based on the contextual information. At step 232, the processing result may be annotated with entities by an entity tagger. Based on the annotations, the semantic information aggregator 230 may generate dictionaries for the retrieved information at step 233. In particular embodiments, the dictionaries may comprise global dictionary features which can be updated dynamically offline. At step 234, the semantic information aggregator 230 may rank the entities tagged by the entity tagger. In particular embodiments, the semantic information aggregator 230 may communicate with different graphs 330 including social graph, knowledge graph, and concept graph to extract ontology data that is relevant to the retrieved information from the user context engine 225. In particular embodiments, the semantic information aggregator 230 may aggregate the user profile, the ranked entities, and the information from the graphs 330. The semantic information aggregator 230 may then send the aggregated information to the NLU module 220 to facilitate the domain classification/selection.

In particular embodiments, the output of the NLU module 220 may be sent to a co-reference module 315 to interpret references of the content objects associated with the user request. In particular embodiments, the co-reference module 315 may be used to identify an item the user request refers to. The co-reference module 315 may comprise reference creation 316 and reference resolution 317. In particular embodiments, the reference creation 316 may create references for entities determined by the NLU module 220. The reference resolution 317 may resolve these references accurately. As an example and not by way of limitation, a user request may comprise "find me the nearest Walmart and direct me there". The co-reference module 315 may interpret "there" as "the nearest Walmart". In particular embodiments, the co-reference module 315 may access the user context engine 225 and the dialog engine 235 when necessary to interpret references with improved accuracy.

In particular embodiments, the identified domains, intents, meta-intents, slots, and meta slots, along with the resolved references may be sent to the entity resolution module 240 to resolve relevant entities. The entity resolution module 240 may execute generic and domain-specific entity resolution. In particular embodiments, the entity resolution module 240 may comprise domain entity resolution 241 and generic entity resolution 242. The domain entity resolution 241 may resolve the entities by categorizing the slots and meta slots into different domains. In particular embodiments, entities may be resolved based on the ontology data extracted from the graphs 330. The ontology data may comprise the structural relationship between different slots/meta-slots and domains. The ontology may also comprise information of how the slots/meta-slots may be grouped, related within a hierarchy where the higher level comprises the domain, and subdivided according to similarities and differences. The generic entity resolution 242 may resolve the entities by categorizing the slots and meta slots into different generic topics. In particular embodiments, the resolving may be also based on the ontology data extracted from the graphs 330. The ontology data may comprise the structural relationship between different slots/meta-slots and generic topics. The ontology may also comprise information of how the slots/meta-slots may be grouped, related within a hierarchy where the higher level comprises the topic, and subdivided according to similarities and differences. As an example and not by way of limitation, in response to the input of an inquiry of the advantages of a Tesla car, the generic entity resolution 242 may resolve a Tesla car as vehicle and the domain entity resolution 241 may resolve the Tesla car as electric car.

In particular embodiments, the output of the entity resolution module 240 may be sent to the dialog engine 235 to forward the flow of the conversation with the user. The dialog engine 235 may comprise dialog intent resolution 236 and dialog state update/ranker 237. In particular embodiments, the dialog intent resolution 236 may resolve the user intent associated with the current dialog session based on dialog history between the user and the assistant system 140. The dialog intent resolution 236 may map intents determined by the NLU module 220 to different dialog intents. The dialog intent resolution 236 may further rank dialog intents based on signals from the NLU module 220, the entity resolution module 240, and dialog history between the user and the assistant system 140. In particular embodiments, the dialog state update/ranker 237 may update/rank the dialog state of the current dialog session. As an example and not by way of limitation, the dialog state update/ranker 237 may update the dialog state as "completed" if the dialog session is over. As another example and not by way of limitation, the dialog state update/ranker 237 may rank the dialog state based on a priority associated with it.

In particular embodiments, the dialog engine 235 may communicate with a task completion module 335 about the dialog intent and associated content objects. In particular embodiments, the task completion module 335 may rank different dialog hypotheses for different dialog intents. The task completion module 335 may comprise an action selection component 336. In particular embodiments, the dialog engine 235 may additionally check against dialog policies 320 regarding the dialog state. In particular embodiments, a dialog policy 320 may comprise a data structure that describes an execution plan of an action by an agent 340. An agent 340 may select among registered content providers to complete the action. The data structure may be constructed by the dialog engine 235 based on an intent and one or more slots associated with the intent. A dialog policy 320 may further comprise multiple goals related to each other through logical operators. In particular embodiments, a goal may be an outcome of a portion of the dialog policy and it may be constructed by the dialog engine 235. A goal may be represented by an identifier (e.g., string) with one or more named arguments, which parameterize the goal. As an example and not by way of limitation, a goal with its associated goal argument may be represented as {confirm_artist, args:{artist: "Madonna"}}. In particular embodiments, a dialog policy may be based on a tree-structured representation, in which goals are mapped to leaves of the tree. In particular embodiments, the dialog engine 235 may execute a dialog policy 320 to determine the next action to carry out. The dialog policies 320 may comprise generic policy 321 and domain specific policies 322, both of which may guide how to select the next system action based on the dialog state. In particular embodiments, the task completion module 335 may communicate with dialog policies 320 to obtain the guidance of the next system action. In particular embodiments, the action selection component 336 may therefore select an action based on the dialog intent, the associated content objects, and the guidance from dialog policies 320.

In particular embodiments, the output of the task completion module 335 may be sent to the CU composer 270. In alternative embodiments, the selected action may require one or more agents 340 to be involved. As a result, the task completion module 335 may inform the agents 340 about the selected action. Meanwhile, the dialog engine 235 may receive an instruction to update the dialog state. As an example and not by way of limitation, the update may comprise awaiting agents' response. In particular embodiments, the CU composer 270 may generate a communication content for the user using the NLG 271 based on the output of the task completion module 335. In particular embodiments, the NLG 271 may use different language models and/or language templates to generate natural language outputs. The generation of natural language outputs may be application specific. The generation of natural language outputs may be also personalized for each user. The CU composer 270 may also determine a modality of the generated communication content using the UI payload generator 272. Since the generated communication content may be considered as a response to the user request, the CU composer 270 may additionally rank the generated communication content using a response ranker 273. As an example and not by way of limitation, the ranking may indicate the priority of the response.

In particular embodiments, the output of the CU composer 270 may be sent to a response manager 325. The response manager 325 may perform different tasks including storing/updating the dialog state 326 retrieved from data store 310 and generating responses 327. In particular embodiments, the output of CU composer 270 may comprise one or more of natural-language strings, speech, or actions with parameters. As a result, the response manager 325 may determine what tasks to perform based on the output of CU composer 270. In particular embodiments, the generated response and the communication content may be sent to the assistant xbot 215. In alternative embodiments, the output of the CU composer 270 may be additionally sent to the TTS module 275 if the determined modality of the communication content is audio. The speech generated by the TTS module 275 and the response generated by the response manager 325 may be then sent to the assistant xbot 215.

In particular embodiments, the assistant system 140 may use one or more non-local machine-learning models to analyze content objects comprising one or more of speech, text, image, video, or a combination of them. The non-local machine-learning models may be based on deep neural networks. In deep neural networks, both convolutional and recurrent operations may be building blocks that process one local neighborhood at a time. In particular embodiments, the non-local machine-learning models may use non-local operations as a generic family of building blocks for capturing long-range dependencies. The non-local machine-learning models may use non-local operations to compute the response at a position as a weighted sum of the features at all positions. The building block may be plugged into a plurality of computer vision architectures. In particular embodiments, the non-local machine-learning models may be applied to the task of video classification. As an example and not by way of limitation, the non-local machine-learning models can compete or outperform current competition winners on both Kinetics and Charades datasets (i.e., two public datasets) even without any bells and whistles. In particular embodiments, the non-local machine-learning models may be also applied to static image recognition. As an example and not by way of limitation, the non-local machine-learning models may improve object detection/segmentation and pose estimation on the COCO (i.e., a public dataset) suite of tasks. Although this disclosure describes particular machine-learning models based on particular building blocks in particular manners, this disclosure contemplates any suitable machine-learning models based on any suitable building blocks in any suitable manner.

In particular embodiments, the assistant system 140 may train a baseline machine-learning model based on a neural network comprising a plurality of stages. Each stage may comprise a plurality of neural blocks. The assistant system 140 may then access a plurality of training samples comprising a plurality of content objects, respectively. In particular embodiments, the assistant system 140 may determine one or more non-local operations. Each non-local operation may be based on one or more pairwise functions and one or more unary functions. In particular embodiments, the assistant system 140 may generate one or more non-local blocks based on the plurality of training samples and the one or more non-local operations. The assistant system 140 may then determine a stage from the plurality of stages of the neural network. In particular embodiments, the assistant system 140 may further train a non-local machine-learning model by inserting each of the one or more non-local blocks in between at least two of the plurality of neural blocks in the determined stage of the neural network.

Capturing long-range dependencies may be of central importance in deep neural networks. For sequential data (e.g., in speech, language), recurrent operations may be the dominant solution to long-range dependency modeling. For image data, long-distance dependencies may be modeled by the large receptive fields formed by deep stacks of convolutional operations.

Convolutional and recurrent operations may both process a local neighborhood, either in space or time. As a result, long-range dependencies may only be captured when these operations are applied repeatedly, propagating signals progressively through the data. Repeating local operations may have several limitations. First, it is computationally inefficient. Second, it causes optimization difficulties that need to be carefully addressed. Finally, these challenges make it difficult to achieve multi-hop dependency modeling, in which messages need to be delivered back and forth between distant positions.

Figure 4:
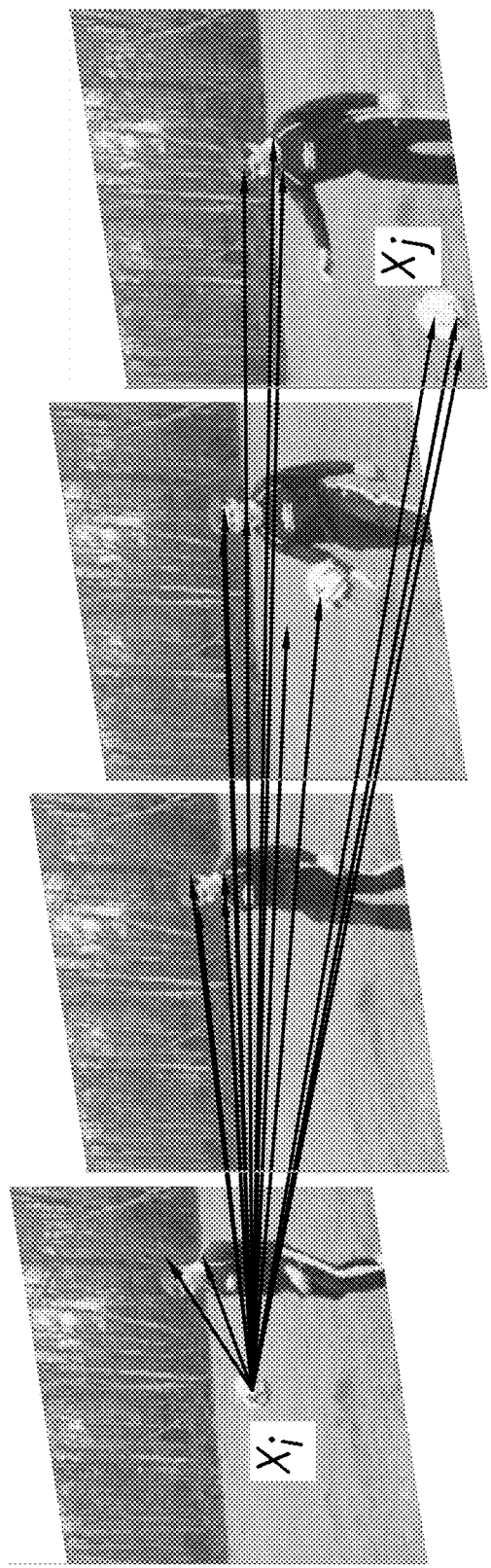
FIG. 4 illustrates an example spacetime non-local operation of a non-local machine-learning model for video classification.

FIG. 4 illustrates an example spacetime non-local operation of a non-local machine-learning model for video classification. In particular embodiments, non-local operations may be an efficient, simple, and generic component for capturing long-range dependencies with deep neural networks. In particular embodiments, the neural network may comprise one or more of a convolutional neural network or a recurrent neural network. The neural network may be based on one or more of a two-dimensional architecture or a three-dimensional architecture. In particular embodiments, a non-local operation may be a generalization of the classical non-local mean operations in computer vision. The non-local operation may compute the response at a position as a weighted sum of the features at all positions in the input feature maps. As indicated in FIG. 4, a position $x_i$'s response is computed by the weighted average of the features of all positions $x_j$ (only the highest weighted ones are shown in FIG. 4). In this example computed by the non-local machine-learning model, note how it relates the ball in the first frame to the ball in the last two frames. More examples are in FIG. 10. The set of positions may be in space, time, or spacetime. Consequently, the non-local operations may be applicable for image, sequence, and video problems.

There may be several technical advantages of using non-local operations: (a) In contrast to the progressive behavior of recurrent and convolutional operations, non-local operations may capture long-range dependencies directly by computing interactions between any two positions, regardless of their positional distance; (b) Non-local operations may be efficient and achieve their best results even with only a few layers (e.g., 5); (c) Finally, the non-local operations may maintain the variable input sizes and can be easily combined with other operations (e.g., convolutions).

In particular embodiments, the effectiveness of non-local operations may be shown in the application of video classification. In videos, long-range interactions may occur between distant pixels in space as well as time. A single non-local block, which is a basic unit of the non-local machine-learning models, may directly capture these space-time dependencies in a feedforward fashion. The architectures of the non-local machine-learning models may be called non-local neural networks. In particular embodiments, with a few non-local blocks, non-local neural networks may be more accurate for video classification than two-dimensional (2D) and three-dimensional (3D) convolutional networks, and the inflated variant of the 2D and 3D convolutional networks. In addition, non-local neural networks may be more computationally economical than their 3D convolutional counterparts. In the embodiments disclosed herein, comprehensive ablation studies are presented on the Kinetics and Charades datasets. In particular embodiments, the non-local machine-learning model achieves results on par with or better than the latest competitions winners on both datasets by using RGB only and without any bells and whistles (e.g., optical flow, multi-scale testing).

In the embodiments disclosed herein, experiments of object detection, segmentation, and pose estimation on the COCO dataset are further presented to demonstrate the generality of non-local operations. As an example and not by way of limitation, the non-local blocks can increase accuracy on all three tasks at a small extra computational cost on top of the strong Mask R-CNN baseline (i.e., a conventional work). Together with the evidence on videos, these image experiments show that non-local operations may be generally useful and become a basic building block in designing deep neural networks.

Non-local image processing. Non-local means is a classical filtering algorithm that computes a weighted mean of all pixels in an image. It allows distant pixels to contribute to the filtered response at a location based on patch appearance similarity. This non-local filtering idea was later developed into BM3D (block-matching 3D), which performs filtering on a group of similar, but non-local, patches. BM3D is a solid image denoising baseline even compared with deep neural networks. Non-local matching is also the essence of successful texture synthesis, super-resolution, and inpainting algorithms.

Conditional random fields. Long-range dependencies can be modeled by graphical models such as conditional random fields (CRF). In the context of deep neural networks, a CRF can be exploited to post-process semantic segmentation predictions of a network. The iterative mean-field inference of CRF can be turned into a recurrent network and jointly trained. In contrast, the embodiments disclosed herein may be simply feedforward for computing non-local filtering.

Feedforward modeling for sequences. Recently there emerged a trend of using feedforward (i.e., non-recurrent) networks for modeling sequences in speech and language. In these methods, long-term dependencies are captured by the large receptive fields contributed by very deep one-dimensional (1D) convolutions. These feedforward models are amenable to parallelized implementations and can be more efficient than widely used recurrent models.

Self-attention. The non-local machine learning model may be related to the recent self-attention method (i.e., a conventional work) for machine translation. A self-attention module computes the response at a position in a sequence (e.g., a sentence) by attending to all positions and taking their weighted average in an embedding space. Self-attention may be viewed as a form of the non-local mean, and in this sense the embodiments disclosed herein may bridge self-attention for machine translation to the more general class of non-local filtering operations that are applicable to image and video problems in computer vision.

Relation networks. Relation networks were recently proposed for relational reasoning tasks. A relation network computes a function on the feature embeddings at all pairs of positions in its input. The non-local machine learning model may also process all pairs. But unlike relation networks that aggregate all pairs into a single output vector by summation, the non-local machine-learning model may produce an output that has the same size as its possibly variably sized input. This may allow the non-local operation to be followed by convolutional or recurrent layers or be used more than once, making it easy and flexible to integrate into standard network architectures used in computer vision.

Video classification architectures. A natural solution to video classification is to combine the success of convolutional neural networks (CNNs) for images and recurrent neural networks (RNNs) for sequences. In contrast, feed-forward models are achieved by 3D convolutions (C3D) in spacetime, and the 3D filters can be formed by "inflating" pre-trained 2D filters. In addition to end-to-end modeling on raw video inputs, it has been found that optical flow and trajectories can be helpful. Both flow and trajectories are off-the-shelf modules that may find long-range, non-local dependency.

In the following, a general definition of non-local operations is given and then several specific instantiations of it are provided.

In particular embodiments, a generic non-local operation in deep neural networks may be defined as:

$$y_i = \frac{1}{C(x)} \sum_{\forall j} f(x_i, x_j) g(x_j). \tag{1}$$

In particular embodiments, each of the one or more non-local operations associated with the non-local machine-learning model may be based on the above function. As used herein, i may indicate the index of an output position whose response is to be computed and j may indicate the index that enumerates all possible positions. In particular embodiments, the output position may be in one or more of space, time, or spacetime. x may indicate an input signal and y may indicate an output signal of the same size as x. In particular embodiments, a pairwise function $f$ may compute a scalar between i and all j. The scalar may represent a relationship such as affinity. In particular embodiments, a unary function g may compute a representation of the input signal at the position j. The response may be further normalized by a normalization factor $C(x)$. In particular embodiments, the input signal may comprise a content object. As an example and not by way of limitation, the content object may comprise one or more of a text, an audio clip, an image, or a video. In particular embodiments, the input signal may comprise the feature representation of the content object. Accordingly, $x_i$ may indicate the feature representation at the output position; $x_j$ may indicate the feature representation at one of the plurality of positions; and $y_i$ may indicate an output response at the output position.

The non-local behavior in equation (1) may be due to the fact that all positions ($\forall_j$) are considered in the operation. As a comparison, a convolutional operation may sum up the weighted input in a local neighborhood (e.g., $i-1 \leq j \leq i+1$ in a 1D case with a kernel size of 3), and a recurrent operation at time i may be often based only on the current and the latest time steps (e.g., j=i or i−1).

The non-local operation may be also different from a fully-connected (fc) layer in a convolutional neural network. Equation (1) may compute responses based on relationships between different locations, whereas fc uses learned weights. In other words, the relationship between $x_j$ and $x_i$ may not be a function of the input data in fc, unlike in non-local layers. Furthermore, the formulation in equation (1) may support inputs of variable sizes and maintain the corresponding size in the output. On the contrary, an fc layer may require a fixed-size input/output and lose positional correspondence (e.g., the correspondence from $x_i$ to $y_i$ at the position i).

In particular embodiments, a non-local operation may be a flexible building block and be easily used together with convolutional/recurrent layers. The building block may be referred as a non-local block. It may be added into the earlier part of deep neural networks, unlike fc layers that are often used in the end. This may allow the building of a richer hierarchy that combines both non-local and local information. In particular embodiments, generating each of the one or more non-local blocks may comprise applying each of the one or more non-local operations to the feature representation of one of the plurality of content objects. In particular embodiments, applying the non-local operation may further comprise determining, for each of the plurality of content objects, an output position and a plurality of positions associated with the output position.

In particular embodiments, the pairwise function $f$ and unary function g may be based on a plurality of different versions. In particular embodiments, the non-local machine-learning model may not be sensitive to these choices of different versions, indicating that the generic non-local behavior may be the main reason for the observed improvements for different tasks (e.g., video analysis).

In particular embodiments, the unary function g may be in the form of a linear embedding: $g(x_j) = W_g x_j$ for simplicity. $W_g$ may indicate a weight matrix to be learned. In particular embodiments, the linear embedding may be implemented as, e.g., 1×1 convolution in space or 1×1×1 convolution in spacetime.

In particular embodiments, the pairwise function $f$ may be based on different functions. As an example and not by way of limitation, the different functions may comprise one or more of Gaussian, embedded Gaussian, dot product, concatenation, any suitable function, or any combination thereof.

Gaussian. In particular embodiments, one choice of the pairwise function $f$ may comprise the Gaussian function, which may be formulated as:

$$f(x_i, x_j) = e^{x_i^T x_j}. \tag{2}$$

In particular embodiments, $x_i^T x_j$ may be dot-product similarity. In alternative embodiments, Euclidean distance may be applicable. However, dot product may be more implementation-friendly in modern deep learning platforms. In particular embodiments, the normalization factor may be set as $C(x)=\Sigma_{\forall j}f(x_i, x_j)$.

Embedded Gaussian. In particular embodiments, another choice of the pairwise function $f$ may comprise an extension of the Gaussian function to compute similarity in an embedding space. In particular embodiments, it may be formulated as:

$$f(x_i,x_j)=e^{\theta(x_i)^T\phi(x_j)}. \quad (3)$$

In particular embodiments, $\theta(x_i)=W_\theta x_i$ and $\phi(x_j)=W_\phi x_j$ may be two embeddings. In particular embodiments, the normalization factor may be set as $C(x)=\Sigma_{\forall j}f(x_i, x_j)$. It may be noted that the self-attention model (i.e., a conventional work) recently presented for machine translation may be a special case of non-local operations in the embedded Gaussian version. This may be seen from the fact that for a given i, $$\frac{1}{C(x)}f(x_i, x_j)$$

may become the softmax computation along the dimension j. Hence, $y=\text{softmax}(x^T W_\theta^T W_\phi x)g(x)$, which is the self-attention form in the self-attention model. As a result, the non-local machine-learning model may provide insight by relating this recent self-attention model to the classic computer vision method of non-local means and extend the sequential self-attention network in the self-attention model to a generic space/spacetime non-local network for image/video recognition in computer vision. Despite the relation to the self-attention model, the attentional behavior (due to softmax) may be not essential in the applications of image and video analysis. To show this, two alternative versions of non-local operations are described next.

Dot product. In particular embodiments, another choice of the pairwise function $f$ may comprise a dot-product similarity, which is formulated as:

$$f(x_i,x_j)=\theta(x_i)^T\phi(x_j). \quad (4)$$

In particular embodiments, the dot-product similarity may be based on the embedded version. In particular embodiments, the normalization factor may be set as $C(x)=N$. N may indicate the number of positions in x rather than the sum of $f$ because it may simplify gradient computation. A normalization like this may enable the input to have variable size. The main difference between the dot product and embedded Gaussian versions may be the presence of softmax, which plays the role of an activation function.

Concatenation. Concatenation is used by the pairwise function in relation networks for visual reasoning. In particular embodiments, another choice of the pairwise function $f$ may be based on a concatenation form, which is formulated as:

$$f(x_i,x_j)=\text{ReLU}(w_f^T[\theta(x_i),\phi(x_j)]). \quad (5)$$

As used herein, $[\cdot,\cdot]$ may denote concatenation and $w_f$ may indicate a weight vector that projects the concatenated vector to a scalar. In particular embodiments, the normalization factor may be set as $C(x)=N$. As used herein, ReLU may indicate a function of a rectified linear unit.

The above several variants may demonstrate the flexibility of the generic non-local operation. In particular embodiments, alternative versions of the pairwise function $f$ may be possible and may improve the performance of the non-local machine-learning models.

Figure 5:
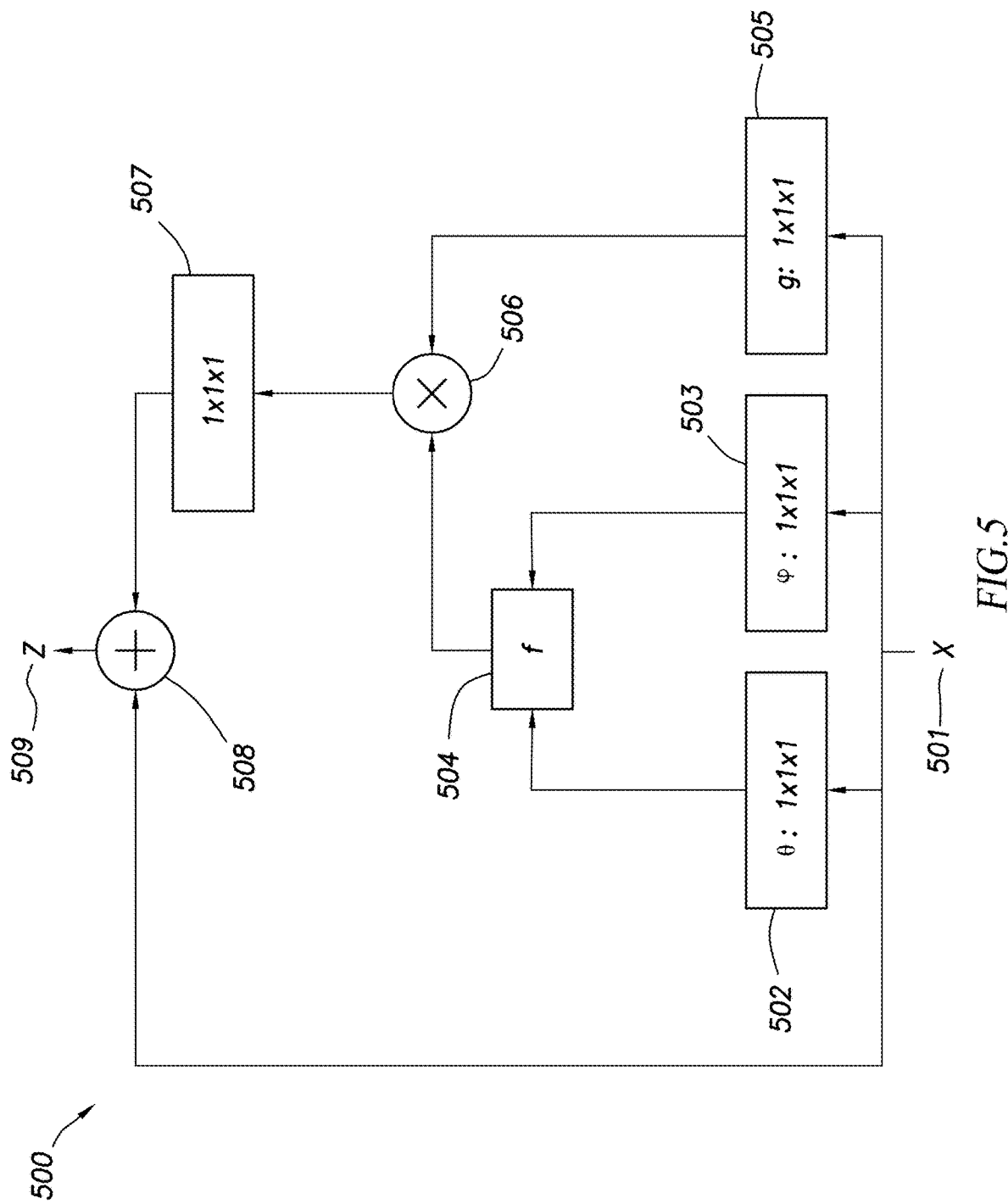
FIG. 5 illustrates an example spacetime non-local block.

FIG. 5 illustrates an example spacetime non-local block 500. In particular embodiments, the non-local operation as characterized in equation (1) may be wrapped into a non-local block 500. The non-local block 500 may be incorporated into many existing architectures. In particular embodiments, a non-local block 500 may be defined as:

$$z_i=W_z y_i+x_i \quad (6)$$

wherein $y_i$ may denote the response given in equation (1) and "$+x_i$" may denote a residual connection. The residual connection may allow a new non-local block 500 to be inserted into any pre-trained model, without breaking its initial behavior (e.g., if $W_z$ is initialized as zero). In FIG. 5, the non-local block 500 takes an input 501 denoted by x, processes it with an embedding 502 denoted by θ, another embedding 503 denoted by ϕ, and a unary function 505 denoted by g. The results from embeddings 502 and 503 are further processed by a pairwise function 504 denoted by $f$. The results from the pairwise function 504 and the unary function 505 go through a matrix multiplication 506 denoted by ⊗. The result from the matrix multiplication 506 is processed by a 1×1×1 convolution 507. The input 501 and the result from the 1×1×1 convolution 507 are processed by an element-wise sum 508 denoted by ⊕, which leads to an output 509 denoted by z.

Figure 6:
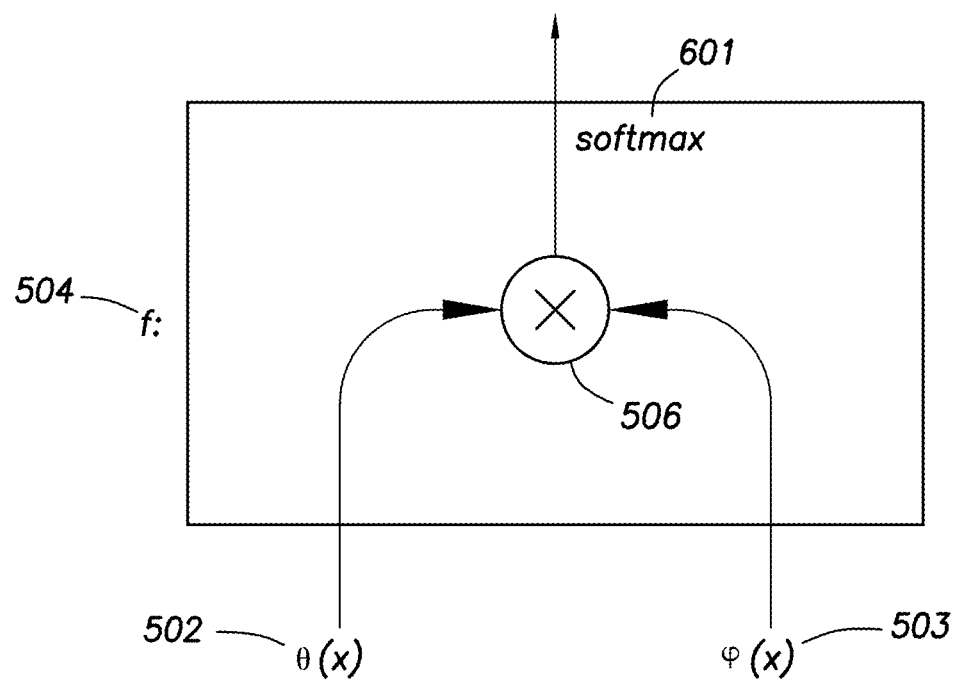
FIG. 6 illustrates an example diagram flow of an embedded Gaussian instantiation.
Figure 7:
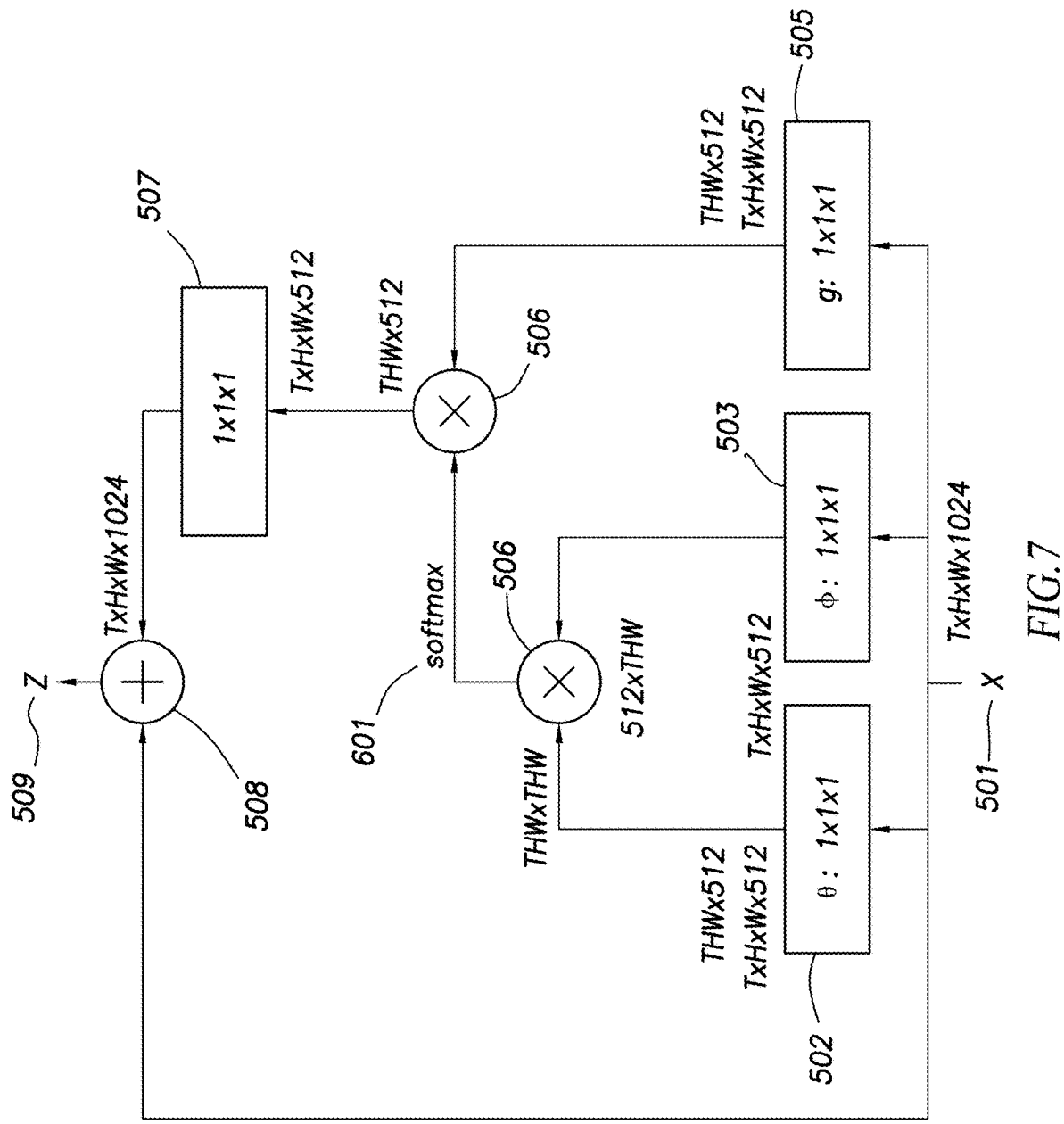
FIG. 7 illustrates an example spacetime non-local block based on the embedded Gaussian instantiation.

In particular embodiments, the pairwise function 504 may be implemented with different instantiations comprising one or more of Gaussian, embedded Gaussian, dot product, or concatenation. FIG. 6 illustrates an example diagram flow of an embedded Gaussian instantiation. As displayed in FIG. 6, the pairwise function 504 based on embedded Gaussian processes the embeddings 502 and 503 with the matrix multiplication 506, after which a softmax operation 601 is applied. FIG. 7 illustrates an example spacetime non-local block 500 based on the embedded Gaussian instantiation. In FIG. 7, the feature maps are shown as the shape of their tensors, e.g., T×H×W×1024 for 1024 channels (proper reshaping is performed when noted). There is a bottleneck of 512 channels. ⊗ denotes matrix multiplication 506 and ⊕ denotes element-wise sum 508. The softmax operation 601 is performed on each row. The Gaussian version can be done by removing θ and ϕ. The pairwise computation in equations (2), (3), or (4) may be simply done by matrix multiplication 506 as shown in FIG. 7.

Figure 8:
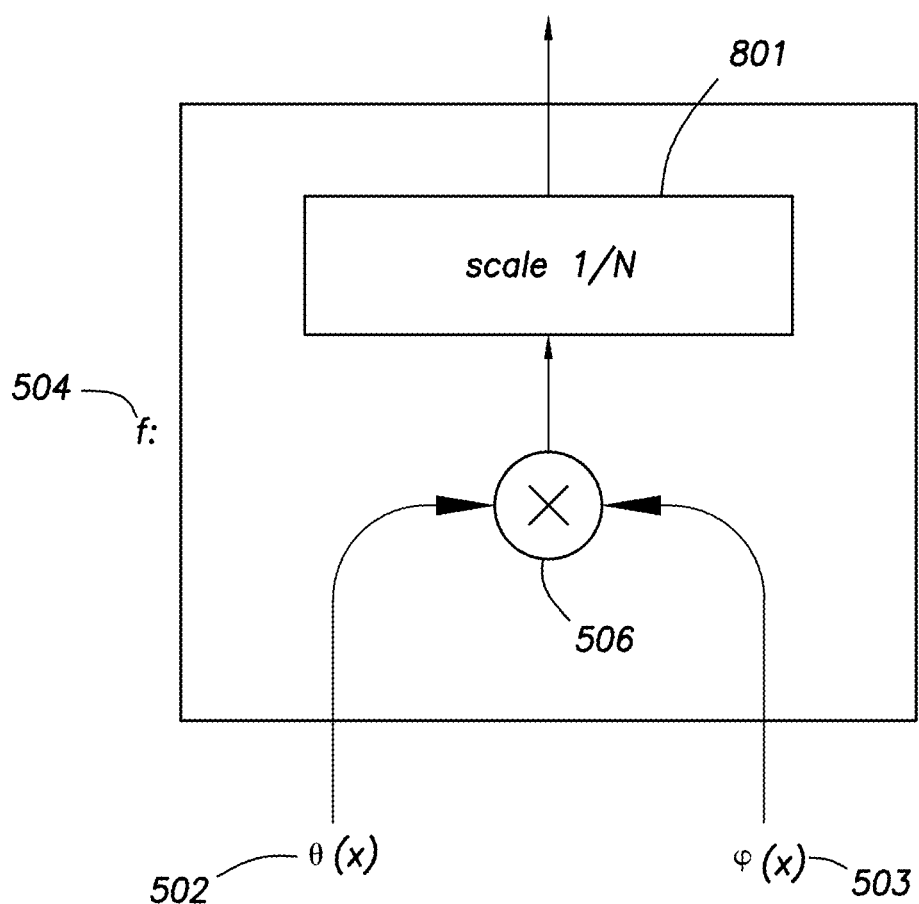
FIG. 8 illustrates an example diagram flow of a dot product instantiation.
Figure 9:
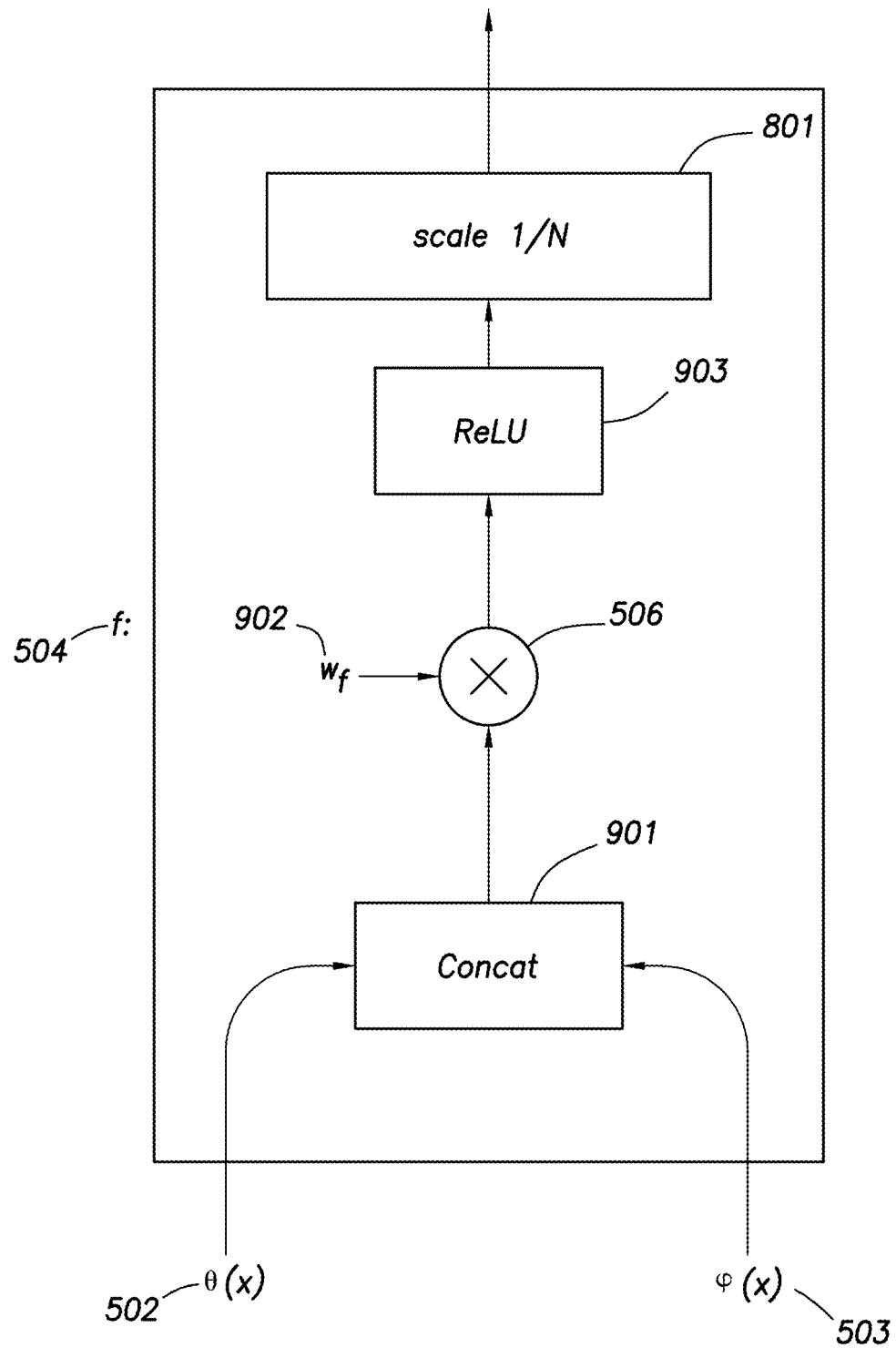
FIG. 9 illustrates an example diagram flow of a concatenation instantiation.

FIG. 8 illustrates an example diagram flow of a dot product instantiation. As displayed in FIG. 8, the pairwise function 504 based on dot product processes the embeddings 502 and 503 with the matrix multiplication 506, after which an operation 801 of scaling by 1/N is applied. FIG. 9 illustrates an example diagram flow of a concatenation instantiation. As displayed in FIG. 9, the pairwise function 504 based on concatenation processes the embeddings 502 and 503 with a concatenation (Concat) operation 901. Then the pairwise function 504 processes a weight factor 902 denoted by $w_f$ and the result from the concatenation operation 901 using the matrix multiplication 506. The result from the matrix multiplication 506 is further processed by a rectified linear unit (ReLU) 903, after which the operation 801 of scaling by 1/N is applied.

In particular embodiments, the pairwise computation of a non-local block 500 may be lightweight when it is used in high-level, sub-sampled feature maps. As an example and not by way of limitation, typical values in FIG. 7 may be T=4 and H=W=14 or 7. In particular embodiments, the pairwise computation as done by matrix multiplication 506 may be comparable to a typical convolutional layer in standard networks. In particular embodiments, the following implementations may be further adopted to make it more efficient.

Implementation of Non-local Blocks. In particular embodiments, the number of channels represented by $W_g$, $W_\theta$, and $W_\phi$ may be set to be half of the number of channels in x. This may reduce the computation of a block by about a half In particular embodiments, the weight matrix $W_z$ in equation (6) may compute a position-wise embedding on $y_i$, matching the number of channels to that of x, as illustrated in FIG. 7.

In particular embodiments, a subsampling trick may be used to further reduce the computation. In particular embodiments, the non-local machine-learning model may generate, for each of the plurality of content objects, a subsampled content object by applying subsampling to the feature representation of the content object. The subsampled content object may be associated with a subsampled feature representation. In particular embodiments, generating each of the one or more non-local blocks 500 may comprise applying each of the one or more non-local operations to the feature representation of one of the plurality of content objects and the subsampled feature representation of the subsampled content object corresponding to the content object. In particular embodiments, the non-local machine-learning model may further determine, for each of the plurality of content objects, an output position and, for each of the plurality of subsampled content objects corresponding to the content object, a plurality of positions associated with the output position. Correspondingly, equation (1) may be modified as:

$$y_i = \frac{1}{C(\hat{x})} \sum_{\forall j} f(x_i, \hat{x}_j) g(\hat{x}_j),$$

wherein $\hat{x}$ may indicate a subsampled version of x. In other words, each of the one or more non-local operations may be based on the above function. As used herein, $x_i$ may indicate the feature representation at the output position; $\hat{x}_j$ may indicate the subsampled feature representation at one of the plurality of positions; $y_i$ may indicate an output response at the output position; $f(x_i, \hat{x}_j)$ may indicate the pairwise function; $g(\hat{x}_j)$ may indicate the unary function; and $C(\hat{x})$ may indicate a normalization factor. In particular embodiments, the subsampling may comprise pooling. As an example and not by way of limitation, the pooling may comprise one or more of max pooling or average pooling. In particular embodiments, the subsampling may be performed in the spatial domain, which can reduce the amount of pairwise computation by ¼. In particular embodiments, subsampling may not alter the non-local behavior, but may only make the computation sparser. In particular embodiments, subsampling may be done by adding a max pooling layer after ϕ and g in FIG. 7. In particular embodiments, these efficient modifications may be used for all non-local blocks 500.

Corresponding to the subsampled content object, the pairwise function 504 may be based on one or more of a Gaussian function $f(x_i, \hat{x}_j) = e^{x_i^T \hat{x}_j}$, an embedded Gaussian function $f(x_i, \hat{x}_j) = e^{\theta(x_i)^T \phi(\hat{x}_j)}$, wherein θ is an embedding 502 for $x_i$ and ϕ is an embedding 503 for $\hat{x}_j$, a dot-product function $f(x_i, \hat{x}_j) = \theta(x_i)^T \phi(\hat{x}_j)$, or a concatenation function $f(x_i, \hat{x}_j) = \text{ReLU}(w_f^T [\theta(x_i), \phi(\hat{x}_j)])$, wherein ReLU indicates a function of a rectified linear unit 903, and wherein $w_f$ is a weight vector 902 projecting a concatenated vector of $\theta(x_i)$ and $\phi(\hat{x}_j)$ to a scalar.

To understand the behavior of non-local networks, comprehensive ablation experiments on video classification tasks are conducted. Correspondingly, the plurality of content objects may comprise a plurality of videos. This subsection first presents a description of baseline network architectures, i.e., baseline machine-learning models, for this task and then presents an extension of these baseline network architectures into a 3D convolutional neural network and the non-local neural networks in the embodiments disclosed herein. As an example and not by way of limitation, the 3D convolution neural network may comprise 3D ConvNets, which is a conventional work. In particular embodiments, training the non-local machine-learning model may comprise generating a plurality of feature representations for the plurality content objects based on the baseline machine-learning model, respectively.

2D ConvNet baseline (C2D). In particular embodiments, a simple 2D baseline architecture is constructed to isolate the temporal effects of the non-local neural networks with respect to the 3D ConvNets. In the constructed 2D baseline architecture, the temporal dimension is trivially addressed (i.e., only by pooling). Table 1 illustrates a constructed C2D baseline under a ResNet-50 (i.e., a conventional convolutional neural network) backbone. In Table 1, the dimensions of 3D output maps and filter kernels are in T×H×W (2D kernels in H×W), with the number of channels following. Residual blocks are shown in brackets. In particular embodiments, the input video clip may comprise 32 frames each with 224×224 pixels (i.e., the input is 32×224×224). All convolutions in Table 1 are in essence 2D kernels that process the input frame-by-frame (implemented as 1×k×k kernels). This model may be directly initialized from the ResNet weights pre-trained on ImageNet (i.e., a public dataset). In particular embodiments, a ResNet-101 (i.e., another conventional convolutional neural network) counterpart may be built in the same way. The only operation involving the temporal domain may be the pooling layers. In other words, this baseline may simply aggregate temporal information.

TABLE 1

A baseline ResNet-50 C2D model for video.

| layer | | output size |
|---|---|---|
| conv₁ | 7 × 7, 64, stride 2, 2, 2 | 16 × 112 × 112 |
| pool₁ | 3 × 3 × 3 max, stride 2, 2, 2 | 8 × 56 × 56 |
| res₂ | $\begin{bmatrix} 1\times1, 64 \\ 3\times3, 64 \\ 1\times1, 256 \end{bmatrix} \times 3$ | 8 × 56 × 56 |
| pool₂ | 3 × 1 × 1 max, stride 2, 1, 1 | 4 × 56 × 56 |
| res₃ | $\begin{bmatrix} 1\times1, 128 \\ 3\times3, 128 \\ 1\times1, 512 \end{bmatrix} \times 4$ | 4 × 28 × 28 |
| res₄ | $\begin{bmatrix} 1\times1, 256 \\ 3\times3, 256 \\ 1\times1, 1024 \end{bmatrix} \times 6$ | 4 × 14 × 14 |

TABLE 1-continued

A baseline ResNet-50 C2D model for video.

| layer | | output size |
|---|---|---|
| res$_5$ | $\begin{bmatrix} 1\times 1, 512 \\ 3\times 3, 512 \\ 1\times 1, 2048 \end{bmatrix} \times 3$ | 4 × 7 × 7 |
| global average pool, fc | | 1 × 1 × 1 |

Inflated 3D ConvNet (I3D). As done in conventional work, one may turn the C2D model in Table 1 into a 3D convolutional counterpart by "inflating" the kernels. As an example and not by way of limitation, a 2D k×k kernel may be inflated as a 3D t×k×k kernel that spans t frames. This kernel may be initialized from 2D models (e.g., pre-trained on ImageNet): each of the t planes in the t×k×k kernel may be initialized by the pre-trained k×k weights and rescaled by 1/t. If a video comprises a single static frame repeated in time, this initialization may produce the same results as the 2D pre-trained model running on a static frame.

In particular embodiments, there may be two cases of inflations. One case may comprise inflating the 3×3 kernel in a residual block to 3×3×3, which may be denoted as I3D$_{3\times 3\times 3}$. The other case may comprise inflating the first 1×1 kernel in a residual block to 3×1×1, which may be denoted as I3D$_{3\times 1\times 1}$. As 3D convolutions may be computationally intensive, one kernel may be only inflated for every 2 residual blocks. In particular embodiments, inflating more layers shows diminishing return. As an example and not by way of limitation, conv$_1$ may be inflated to 5×7×7. Conventional work has shown that I3D models are more accurate than the CNN (convolutional neural network)+LSTM (long-short term memory) counterparts.

Non-local network. In particular embodiments, the non-local blocks 500 may be inserted into a C2D model or a I3D model to turn them into non-local neural networks. In particular embodiments, a different number of non-local blocks 500 may be added. As an example and not by way of limitation, the embodiments disclosed herein investigate adding 1, 5, or 10 non-local blocks 500. The implementation details are described in the next section in context.

Training. In particular embodiments, the non-local machine-learning models may be pre-trained on ImageNet. In particular embodiments, the non-local machine-learning models may be further fine-tuned using 32-frame input clips. These clips may be formed by randomly cropping out 64 consecutive frames from the original full-length video and then dropping every other frame. In particular embodiments, the spatial size may be 224×224 pixels, randomly cropped from a scaled video whose shorter side is randomly sampled in [256, 320] pixels. In particular embodiments, the non-local machine-learning models may be trained on an 8-GPU machine and each GPU may have 8 clips in a mini-batch (so in total with a mini-batch size of 64 clips). In particular embodiments, the non-local machine-learning models may be trained for 400 k iterations in total, starting with a learning rate of 0.01 and reducing it by a factor of 10 at every 150 k iterations. In particular embodiments, a momentum of 0.9 and a weight decay of 0.0001 may be used. In particular embodiments, a dropout may be adopted after the global pooling layer, with a dropout ratio of 0.5. In particular embodiments, the non-local machine-learning models may be fine-tuned with BatchNorm (BN) (i.e., a conventional work) enabled when it is applied. This is in contrast to common practice of fine-tuning ResNets, in which BN was frozen. In particular embodiments, enabling BN in the application of image/video analysis may reduce overfitting. In particular embodiments, the weight layers introduced in the non-local blocks 500 may be initialized based on conventional work. In particular embodiments, a BN layer may be added right after the last 1×1×1 layer that represents W$_z$. In particular embodiments, the BN layer may not be added to other layers in a non-local block 500. In particular embodiments, the scale parameter of the BN layer may be initialized as zero. This may ensure that the initial state of the entire non-local block 500 is an identity mapping so it can be inserted into any pre-trained networks while maintaining its initial behavior.

Inference. In particular embodiments, spatially fully-convolutional inference on videos whose shorter side is rescaled to 256 may be performed. For the temporal domain, in the embodiments disclosed herein 10 clips may be sampled evenly from a full-length video and the softmax scores on them may be computed individually. The final prediction may comprise the averaged softmax scores of all clips. In particular embodiments, the inference may comprise receiving a querying content object and determining a category for the querying content object based on the non-local machine-learning model.

In the embodiments disclosed herein, comprehensive studies on the challenging Kinetics dataset (a public dataset) are performed. The results on the Charades dataset (a public dataset) are also reported to show the generality of the non-local machine-learning models disclosed herein.

Kinetics contains ~246 k training videos and 20 k validation videos. It is a classification task involving 400 human action categories. In particular embodiments, all non-local machine-learning models are trained on the training set and tested on the validation set.

Figure 10:
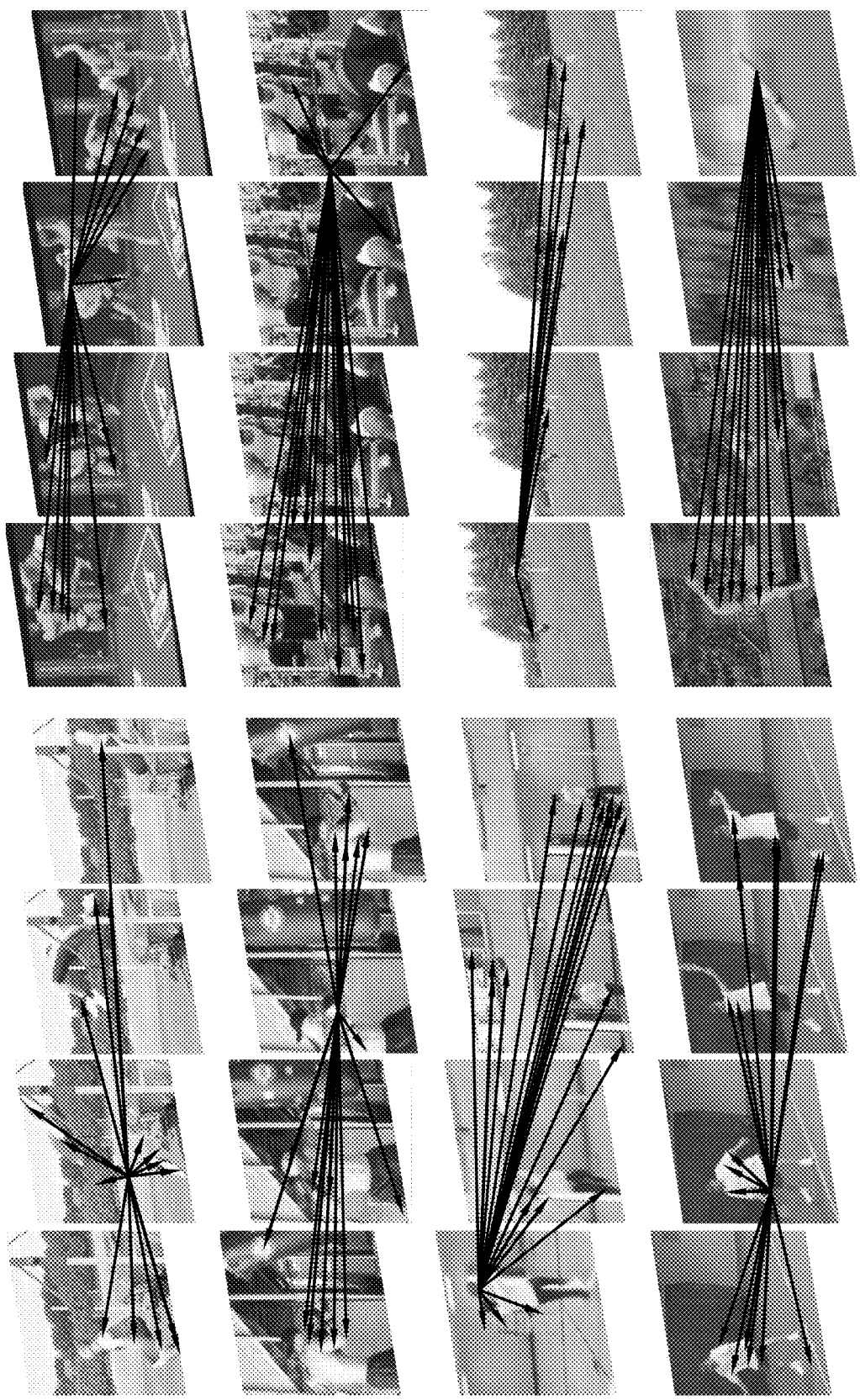
FIG. 10 illustrates an example visualization of several examples of the behavior of a non-local block computed by the non-local machine-learning models.

FIG. 10 illustrates an example visualization of several examples of the behavior of a non-local block 500 computed by the non-local machine-learning models. Similarly, FIG. 4 also visualizes several examples of the behavior of a non-local block 500 computed by the non-local machine-learning models. In FIG. 10, the examples of the behavior of a non-local block 500 in res$_3$ is computed by a 5-block non-local machine-learning model trained on Kinetics. These examples are from held-out validation videos. The starting point of arrows represents one x$_i$ and the ending points represent x$_j$. The 20 highest weighted arrows for each x$_i$ are visualized. The 4 frames are from a 32-frame input, shown with a stride of 8 frames. These visualizations show how the model finds related clues to support its prediction. In particular embodiments, the non-local machine-learning models may learn to find meaningful relational clues regardless of the distance in space and time.

Figure 11:
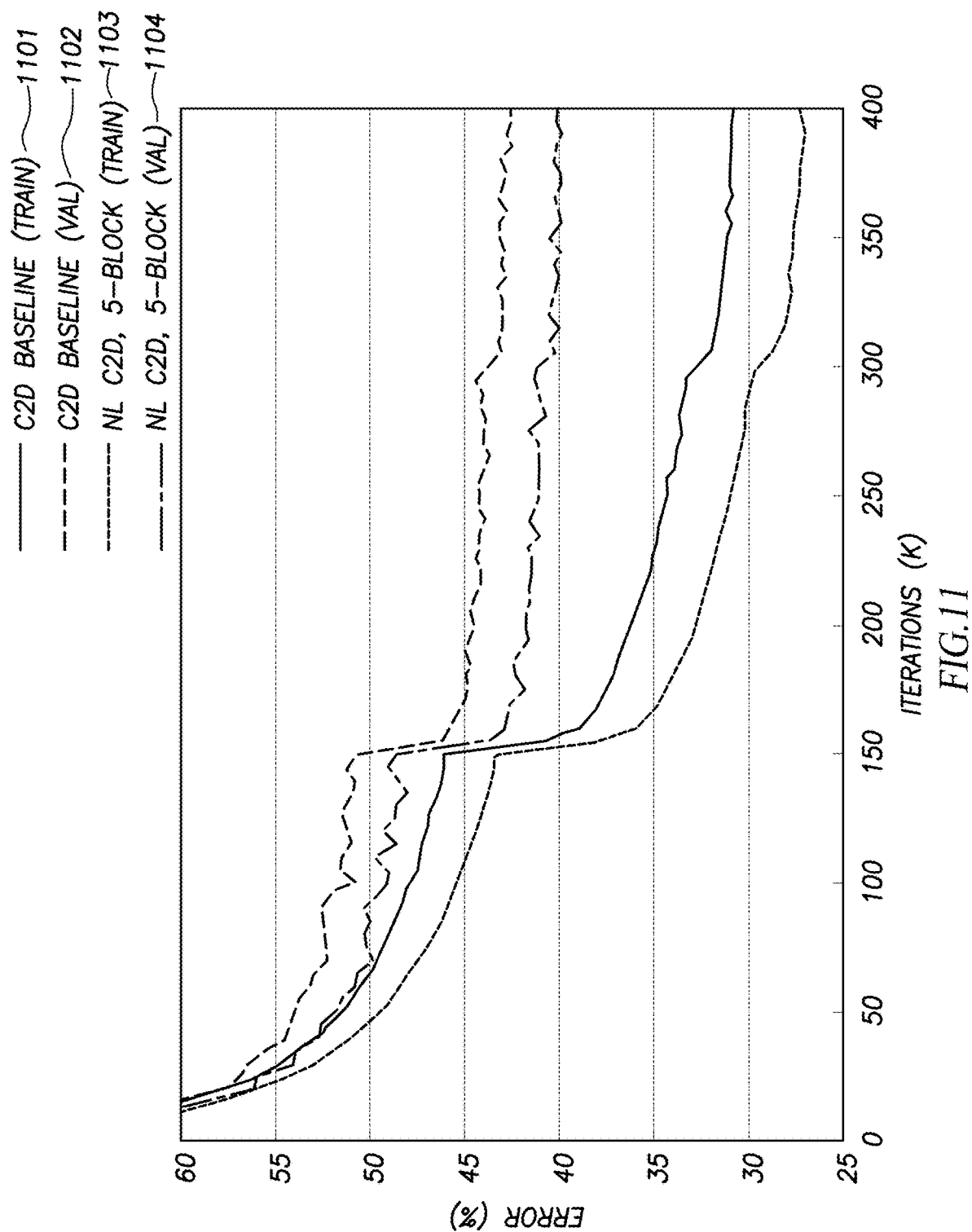
FIG. 11 illustrates example curves of a training procedure of a plurality of non-local machine-learning models.

FIG. 11 illustrates example curves of a training procedure of a plurality of non-local machine-learning models. In particular, the example curves comprise the training procedure of a ResNet-50 C2D baseline 1101 vs. a non-local C2D with 5 blocks 1103, and the validation procedure of the ResNet-50 C2D baseline 1102 vs. the non-local C2D with 5 blocks 1104. As used herein, "non-local C2D" indicates the non-local machine-learning model based on the C2D architecture. The top-1 training error (1101 and 1103) and validation error (1102 and 1104) are shown in FIG. 11. The validation error is computed in the same way as the training error (so it is 1-clip testing with the same random jittering at training time). More details regarding FIG. 11 are disclosed in the following. In particular embodiments, the non-local C2D model is consistently better than the C2D baseline throughout the training procedure, in both training and validation error.

TABLE 2

Ablations on Kinetics action classification with top-1 and top-5 classification accuracy (%).

(a) Instantiations: 1 non-local block of different types is added into the C2D baseline. All entries are with ResNet-50.

| model, R50 | top-1 | top-5 |
| --- | --- | --- |
| C2D baseline | 71.8 | 89.7 |
| Gaussian | 72.5 | 90.2 |
| Gaussian, embed | 72.7 | 90.5 |
| dot-product | 72.9 | 90.3 |
| concatenation | 72.8 | 90.5 |

(b) Stages: 1 non-local block is added into different stages. All entries are with ResNet-50.

| model, R50 | top-1 | top-5 |
| --- | --- | --- |
| baseline | 71.8 | 89.7 |
| $res_2$ | 72.7 | 90.3 |
| $res_3$ | 72.9 | 90.4 |
| $res_4$ | 72.7 | 90.5 |
| $res_5$ | 72.3 | 90.1 |

(c) Deeper non-local models: A comparison between 1, 5, and 10 non-local blocks being added to the C2D base-line. Results for ResNet-50 (top) and ResNet-101 (bottom) are shown.

| | model | top-1 | top-5 |
| --- | --- | --- | --- |
| R50 | baseline | 71.8 | 89.7 |
| | 1-block | 72.7 | 90.5 |
| | 5-block | 73.8 | 91.0 |
| | 10-block | 74.3 | 91.2 |
| R101 | baseline | 73.1 | 91.0 |
| | 1-block | 74.3 | 91.3 |
| | 5-block | 75.1 | 91.7 |
| | 10-block | 75.1 | 91.6 |

(d) Space vs. time vs. spacetime: A comparison between non-local operations applied along space, time, and spacetime dimensions respectively. 5 non-local blocks are used.

| | model | top-1 | top-5 |
| --- | --- | --- | --- |
| R50 | baseline | 71.8 | 89.7 |
| | space-only | 72.9 | 90.8 |
| | time-only | 73.1 | 90.5 |
| | spacetime | 73.8 | 91.0 |
| R101 | baseline | 73.1 | 91.0 |
| | space-only | 74.4 | 91.3 |
| | time-only | 74.4 | 90.5 |
| | spacetime | 75.1 | 91.7 |

(e) Non-local vs. 3D Conv: A 5-block non-local C2D vs. inflated 3D ConvNet (I3D). All entries are with ResNet-101. The numbers of parameters and FLOPs are relative to the C2D baseline (43.2 M and 34.2 B).

| model, R101 | parameters | FLOPs | top-1 | top-5 |
| --- | --- | --- | --- | --- |
| C2D baseline | 1× | 1× | 73.1 | 91.0 |
| $I3D_{3\times3\times3}$ | 1.5× | 1.8× | 74.1 | 91.2 |
| $I3D_{3\times1\times1}$ | 1.2× | 1.5× | 74.4 | 91.1 |
| NL C2D, 5-block | 1.2× | 1.2× | 75.1 | 91.7 |

TABLE 2-continued

Ablations on Kinetics action classification with top-1 and top-5 classification accuracy (%).

(f) Non-local 3D ConvNet: 5 non-local blocks are added on top of the best I3D models. These results show that non-local operations are complementary to 3D convolutions.

| | model | top-1 | top-5 |
| --- | --- | --- | --- |
| R50 | C2D baseline | 71.8 | 89.7 |
| | I3D | 73.3 | 90.7 |
| | NL I3D | 74.9 | 91.6 |
| R101 | C2D baseline | 73.1 | 91.0 |
| | I3D | 74.4 | 91.1 |
| | NL I3D | 76.0 | 92.1 |

(g) Longer clips: the models in Table 2f are fine-tuned and tested on the 128-frame clips. The gains of the non-local operations are consistent.

| | model | top-1 | top-5 |
| --- | --- | --- | --- |
| R50 | C2D baseline | 73.8 | 91.2 |
| | I3D | 74.9 | 91.7 |
| | NL I3D | 76.5 | 92.6 |
| R101 | C2D baseline | 75.3 | 91.8 |
| | I3D | 76.4 | 92.7 |
| | NL I3D | 77.7 | 93.3 |

Table 2 shows the ablation results, which are analyzed as follows.

Instantiations. Table 2a compares different types of a single non-local block 500 added to the C2D baseline (right before the last residual block of $res_4$). In particular embodiments, even adding one non-local block 500 can lead to ~1% improvement over the baseline. In particular embodiments, the embedded Gaussian, dot-product, and concatenation versions perform similarly, up to some random variations (72.7 to 72.9). As discussed previously, the non-local operations with Gaussian kernels become similar to the conventional work of self-attention module. However, the experiments disclosed herein show that the attentional (softmax) behavior of this module may be not the key to the improvement in the applications of video classification. Instead, it may be more likely that the non-local behavior is essential and it is insensitive to the instantiations. In the rest of this disclosure regarding the experiments, the embedded Gaussian version is used by default. In particular embodiments, the embedded Gaussian version may be easier to visualize as its softmax scores are in the range of [0, 1].

Which stage to add non-local blocks? In particular embodiments, the non-local machine-learning model may determine a stage from the plurality of stages of the neural network to insert the one or more non-local blocks 500. Table 2b compares a single non-local block 500 added to different stages of ResNet. The non-local block 500 is added to right before the last residual block of a stage. The improvement of a non-local block 500 on $res_2$, $res_3$, or $res_4$ is similar, and on $res_5$ is slightly smaller. One possible explanation may be that res5 has a small spatial size (7×7) and it may be insufficient to provide precise spatial information. More evidence of a non-local block 500 exploiting spatial information is investigated in Table 2d.

Going deeper with non-local blocks. Table 2c shows the results of more non-local blocks 500. The embodiments disclosed herein add 1 block (to $res_4$), 5 blocks (3 to $res_4$ and 2 to $res_3$, to every other residual block), and 10 blocks (to every residual block in $res_3$ and $res_4$) in ResNet-50. The embodiments disclosed herein similarly add these non-local blocks in ResNet-101 to the corresponding residual blocks. Table 2c shows that more non-local blocks 500 in general lead to better results. In particular embodiments, multiple non-local blocks 500 may perform long-range multi-hop communication. Messages can be delivered back and forth between distant positions in spacetime, which may be hard to do via local models. It is noteworthy that the improvement of non-local blocks 500 may be not just because they add depth to the baseline model. To see this, it is noted that in Table 2c the non-local 5-block ResNet-50 model has 73.8 accuracy, higher than the deeper ResNet-101 baseline's 73.1. However, the 5-block ResNet-50 has only 70% parameters and 80% FLOPs of the ResNet-101 baseline and is also shallower. This comparison shows that the improvement due to non-local blocks 500 is complementary to going deeper in standard ways. In particular embodiments, standard residual blocks instead of non-local blocks 500 are added to the baseline models. The accuracy is not increased. This again shows that the improvement of non-local blocks 500 may be not just because they add depth.

Non-local in spacetime. In particular embodiments, the non-local machine-learning model may naturally handle spacetime signals. This may be a nice property because related objects in a video can present at distant space and long-term time interval, and their dependency can be captured by the non-local machine-learning model. In Table 2d the effect of non-local blocks 500 applied along space, time, or spacetime is studied. As an example and not by way of limitation, in the space-only version, the non-local dependency only happens within the same frame, i.e., in equation (1) it only sums over the index j in the same frame of the index i. The time-only version can be set up similarly. Table 2d shows that both the space-only and time-only versions improve over the C2D baseline but are inferior to the spacetime version.

Non-local net vs. 3D ConvNet. Table 2e compares the non-local C2D version of the non-local machine-learning model with a conventional work of the inflated 3D ConvNets. In particular embodiments, non-local operations and 3D convolutions may be seen as two ways of extending C2D to the temporal dimensions. Table 2e also compares the number of parameters and FLOPs, relative to the baseline. The non-local C2D (NL C2D) model is more accurate than the I3D counterpart (e.g., 75.1 vs. 74.4), while having a smaller number of FLOPs (1.2× vs. 1.5×). This comparison shows that the non-local machine-learning model may be more effective than 3D convolutions when used alone.

Non-local 3D ConvNet. Despite the above comparison, non-local operations and 3D convolutions can model different aspects of the problem, i.e., 3D convolutions can capture local dependency. Table 2f shows the results of inserting 5 non-local blocks 500 into the $I3D_{3\times1\times1}$ models. These non-local I3D (NL I3D) models improve over their I3D counterparts (+1.6 point accuracy), showing that non-local operations and 3D convolutions are complementary.

Longer sequences. In particular embodiments, the generality of the non-local machine-learning models on longer input videos are investigated. In particular embodiments, the non-local machine-learning models may take input clips consisting of 128 consecutive frames without subsampling. The sequences throughout all layers in the networks are thus 4× longer compared to the 32-frame counterparts. To fit this model into memory, the mini-batch size is reduced to 2 clips per GPU. As a result of using small mini-batches, all BN layers are frozen in this case. In particular embodiments, this model may be initialized from the corresponding models trained with 32-frame inputs. In particular embodiments, this model may be fine-tuned on 128-frame inputs using the same number of iterations as the 32-frame case (though the mini-batch size is now smaller), starting with a learning rate of 0.0025. Other implementation details are the same as before. Table 2g shows the results of 128-frame clips. Compared with the 32-frame counterparts in Table 2f, all models have better results on longer inputs. In particular embodiments, the NL I3D model may maintain its gain over the I3D counterparts, showing that the non-local machine-learning models may work well on longer sequences.

Comparisons with state-of-the-art results. Table 3 shows the results from the conventional work of I3D model (two results in the top row) and from the conventional work of Kinetics 2017 competition winner (four results in the middle row). In Table 3, numbers with † indicate results on the test set, otherwise on the validation set. The best results of the Kinetics 2017 competition winner exploited audio signals (the last three results in the middle row) so they are not vision-only solutions. In particular embodiments, these are comparisons of systems which can differ in many aspects. Nevertheless, the non-local machine-learning model (NL I3D) surpasses all the existing RGB or RGB+flow based methods by a good margin. Without using optical flow and without any bells and whistles, the non-local machine-learning model is on par with the heavily engineered results of the 2017 competition winner.

TABLE 3

Comparisons with state-of-the-art results in Kinetics.

| model | backbone | modality | top-1 | top-5 |
| --- | --- | --- | --- | --- |
| I3D | Inception | RGB | 71.1† | 89.3† |
| 2-Stream I3D | Inception | RGB + flow | 74.2† | 91.3† |
| RGB baseline | Inception-ResNet-v2 | RGB | 73.0 | 90.9 |
| 3-stream late fusion | Inception-ResNet-v2 | RGB + flow + audio | 74.9 | 91.6 |
| 3-stream LSTM | Inception-ResNet-v2 | RGB + flow + audio | 77.1 | 93.2 |
| 3-stream SATT | Inception-ResNet-v2 | RGB + flow + audio | 77.7 | 93.2 |
| NL I3D | ResNet-50 | RGB | 76.5 | 92.6 |
|  | ResNet-101 | RGB | 77.7 | 93.3 |

Charades is a public video dataset with 8 k training, 1.8 k validation, and 2 k testing videos. It is a multi-label classification task with 157 action categories. In particular embodiments, a per-category sigmoid output is used to handle the multi-label property. The non-local machine-learning models are initialized pre-trained on Kinetics (128-frame). The mini-batch size is set to 1 clip per GPU. In particular embodiments, the non-local machine-learning models are trained for 200 k iterations, starting from a learning rate of 0.00125 and reducing it by 10 every 75 k iterations. A jittering strategy similar to that in Kinetics is used to determine the location of the 224×224 cropping window, but the video is rescaled such that this cropping window outputs 288×288 pixels, on which the non-local neural network is fine-tuned. The test is performed on a single scale of 320 pixels. Table 4 shows the comparisons with the previous results of conventional work on Charades. The results of the non-local machine-learning models are based on ResNet-101. The NL I3D uses 5 non-local blocks 500. The result of I3D from the conventional work is the 2017 competition winner in Charades, which was also fine-tuned from models pre-trained in Kinetics. The I3D baseline as disclosed herein is higher than previous results. As a controlled comparison, the non-local neural network improves over the I3D baseline by 2.3% on the test set.

TABLE 4

Classification accuracy (%) in the Charades dataset
on the train/val split and the trainval/test split.

| model | modality | train/val | trainval/test |
|---|---|---|---|
| 2-Stream | RGB + flow | 18.6 | — |
| 2-Stream + LSTM | RGB + flow | 17.8 | — |
| Asyn-TF | RGB + flow | 22.4 | — |
| I3D [conventional] | RGB | 32.9 | 34.4 |
| I3D [disclosed herein] | RGB | 35.5 | 37.2 |
| NL I3D | RGB | 37.5 | 39.5 |

In particular embodiments, the non-local machine-learning models on static image recognition are also investigated. Experiment on the Mask R-CNN baseline (i.e., a conventional work) for COCO (i.e., a public dataset) object detection/segmentation and human pose estimation (keypoint detection) is performed. The models are trained on COCO train2017 (i.e., trainval35k in 2014) and tested on val2017 (i.e., minival in 2014).

Object detection and instance segmentation. The non-local machine-learning models modify the Mask R-CNN backbone by adding one non-local block 500 (right before the last residual block of $res_4$). All models are fine-tuned from ImageNet pre-training. The evaluation is performed on a standard baseline of ResNet-50/101 and a high baseline of ResNeXt-152 (X152) which is a conventional work. Unlike the conventional work that adopted stage-wise training regarding region proposal network (RPN), the embodiments disclosed herein use an improved implementation with end-to-end joint training, which leads to higher baselines than the conventional work.

Table 5 shows the box and mask average precision (AP) on COCO. In Table 5, the backbone is ResNet-50/101 or ResNeXt-152 both with feature pyramid networks (FPN) (i.e., a conventional neural network architecture). It may be seen that a single non-local block 500 improves all R50/101 and X152 baselines on all metrics involving detection and segmentation. $AP^{box}$ is increased by 1 point in all cases (e.g., +1.3 points in R101). The non-local block 500 has a nice effect complementary to increasing the model capacity, even when the model is upgraded from R50/101 to X152. This comparison suggests that non-local dependency has not been sufficiently captured by existing models despite increased depth/capacity. In addition, the above gain is at a very small cost. The single non-local block 500 only adds <5% computation to the baseline model. In particular embodiments, more non-local blocks 500 were added to the backbone, but diminishing return occurred.

TABLE 5

Adding 1 non-local block (NL) to Mask R-CNN for
COCO object detection and instance segmentation.

| | method | $AP^{box}$ | $AP_{50}^{box}$ | $AP_{75}^{box}$ | $AP^{mask}$ | $AP_{50}^{mask}$ | $AP_{75}^{mask}$ |
|---|---|---|---|---|---|---|---|
| R50 | baseline + | 38.0 | 59.6 | 41.0 | 34.6 | 56.4 | 36.5 |
| | 1 NL | 39.0 | 61.1 | 41.9 | 35.5 | 58.0 | 37.4 |
| R101 | baseline + | 39.5 | 61.4 | 42.9 | 36.0 | 58.1 | 38.3 |
| | 1 NL | 40.8 | 63.1 | 44.5 | 37.1 | 59.9 | 39.2 |
| X152 | baseline + | 44.1 | 66.4 | 48.4 | 39.7 | 63.2 | 42.2 |
| | 1 NL | 45.0 | 67.8 | 48.9 | 40.3 | 64.4 | 42.8 |

Keypoint detection. Next non-local blocks 500 in Mask R-CNN for keypoint detection are evaluated. In a conventional work, Mask R-CNN used a stack of 8 convolutional layers for predicting the keypoints as 1-hot masks. These layers are local operations and may overlook the dependency among keypoints across long distance. The embodiments disclosed herein insert 4 non-local blocks 500 into the keypoint head (after every 2 convolutional layers). Table 6 shows the results on COCO. On a strong baseline of R101, adding 4 non-local blocks 500 to the keypoint head leads to a 1 point increase of keypoint AP. If one extra non-local block 500 is added to the backbone as done for object detection, an in total 1.4 points increase of key-point AP over the baseline may be observed. In particular, it may be seen that the stricter criterion of $AP_{75}$ is boosted by 2.4 points, suggesting a stronger localization performance.

TABLE 6

Adding non-local blocks (NL) to Mask R-CNN for COCO keypoint
detection. The backbone is ResNet-101 with FPN.

| model | $AP^{kp}$ | $AP_{50}^{kp}$ | $AP_{75}^{kp}$ |
|---|---|---|---|
| R101 baseline | 65.1 | 86.8 | 70.4 |
| NL, +4 in head | 66.0 | 87.1 | 71.7 |
| NL, +4 in head, +1 in backbone | 66.5 | 87.3 | 72.8 |

The embodiments disclosed herein presented a new class of neural networks which capture long-range dependencies via non-local operations. In particular embodiments, the non-local blocks 500 may be combined with any existing architectures. The significance of non-local modeling for the tasks of video classification, object detection and segmentation, and pose estimation is shown. On all tasks, a simple addition of non-local blocks 500 provides solid improvement over baselines. In particular embodiments, non-local layers may become an essential component of future network architectures.

Figure 12:
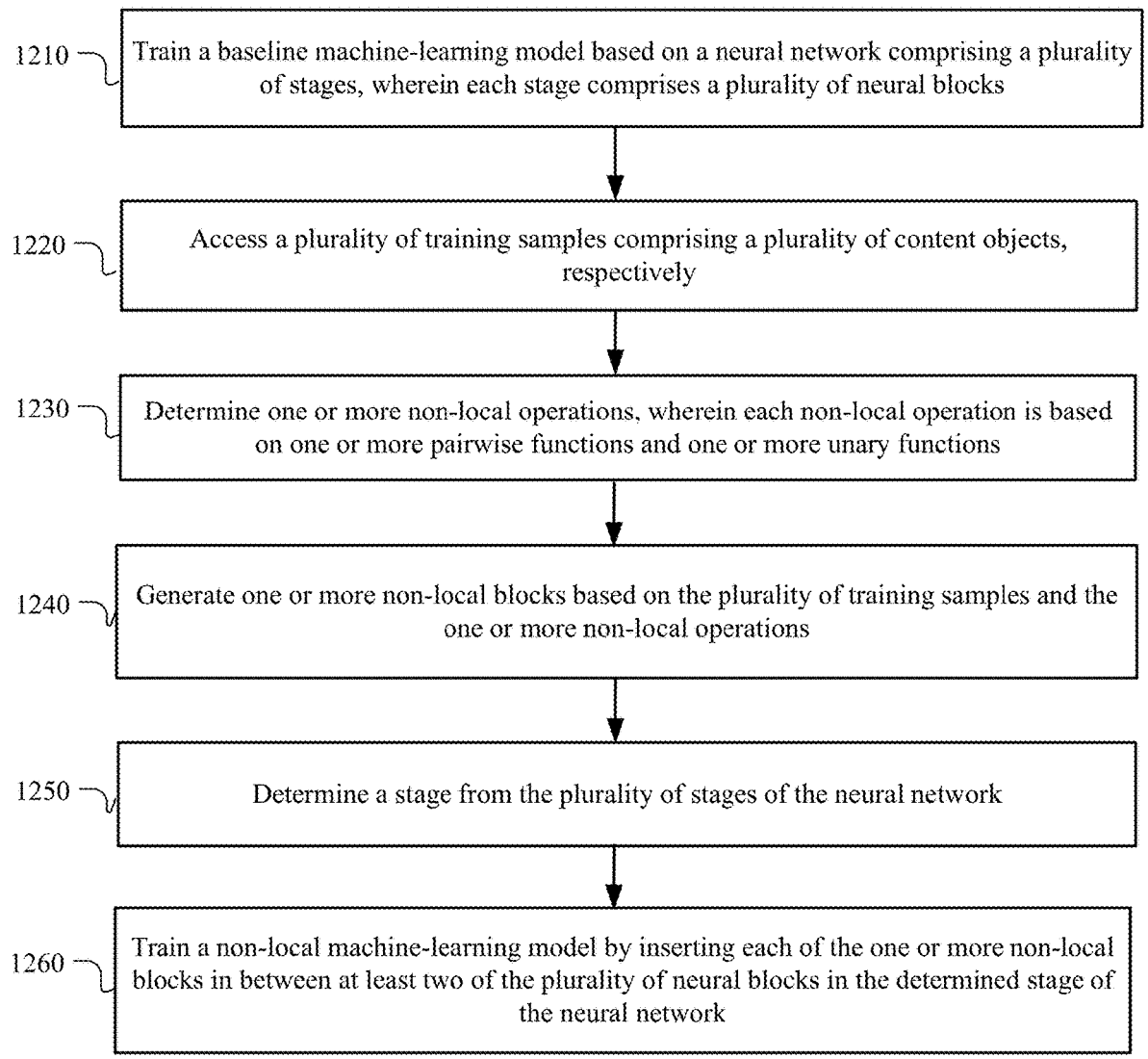
FIG. 12 illustrates an example method for training a non-local machine-learning model.

FIG. 12 illustrates an example method 1200 for training a non-local machine-learning model. The method may begin at step 1210, where the assistant system 140 may train a baseline machine-learning model based on a neural network comprising a plurality of stages, wherein each stage comprises a plurality of neural blocks. At step 1220, the assistant system 140 may access a plurality of training samples comprising a plurality of content objects, respectively. At step 1230, the assistant system 140 may determine one or more non-local operations, wherein each non-local operation is based on one or more pairwise functions 504 and one or more unary functions 505. At step 1240, the assistant system 140 may generate one or more non-local blocks 500 based on the plurality of training samples and the one or more non-local operations. At step 1250, the assistant system 140 may determine a stage from the plurality of stages of the neural network. At step 1260, the assistant system 140 may train a non-local machine-learning model by inserting each of the one or more non-local blocks 500 in between at least two of the plurality of neural blocks in the determined stage of the neural network. Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for training a non-local machine-learning model, including the particular steps of the method of FIG. 12, this disclosure contemplates any suitable method for training a non-local machine-learning model, including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Figure 13:
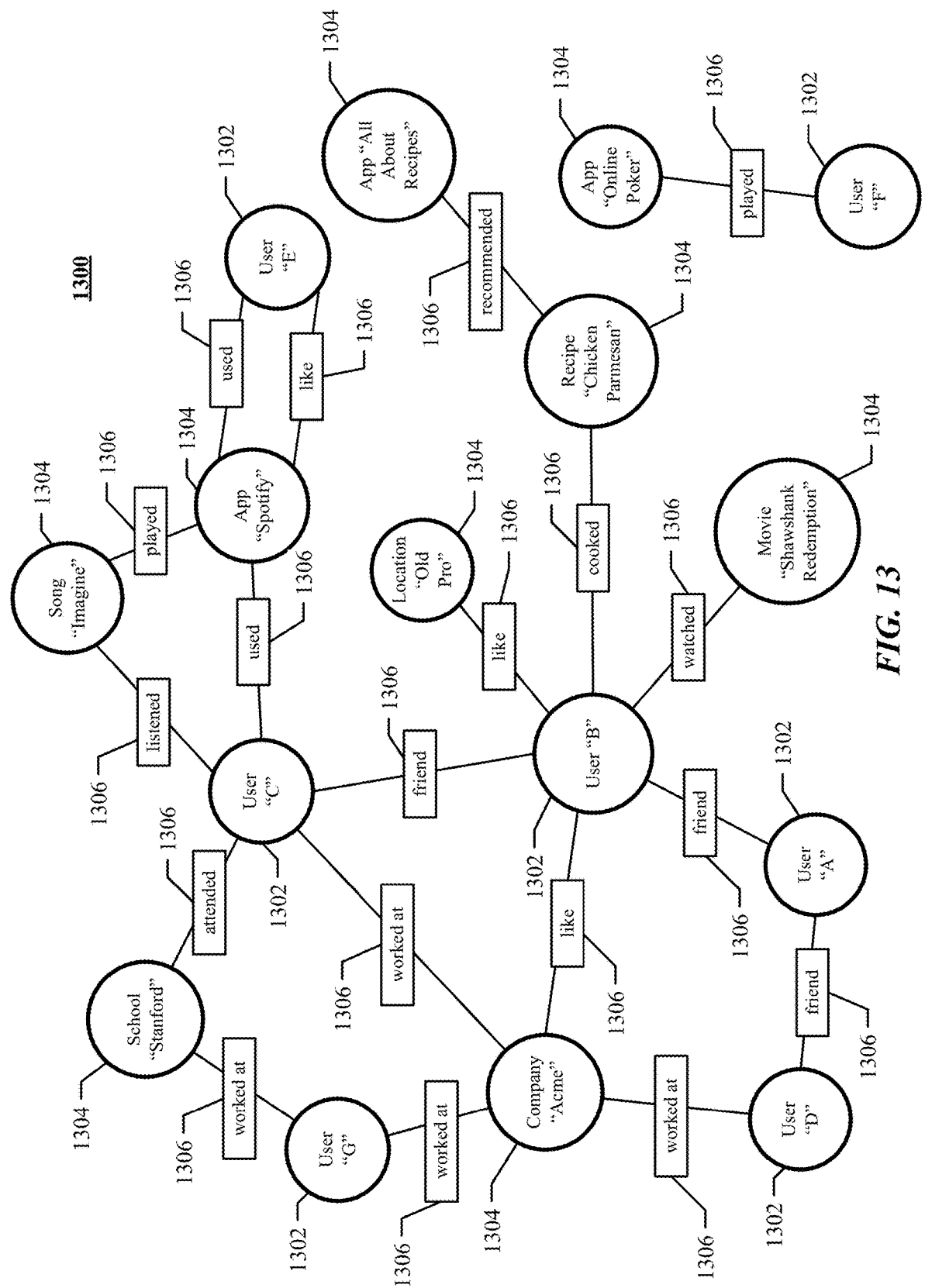
FIG. 13 illustrates an example social graph.

FIG. 13 illustrates an example social graph 1300. In particular embodiments, the social-networking system 160 may store one or more social graphs 1300 in one or more data stores. In particular embodiments, the social graph 1300 may include multiple nodes—which may include multiple user nodes 1302 or multiple concept nodes 1304—and multiple edges 1306 connecting the nodes. Each node may be associated with a unique entity (i.e., user or concept), each of which may have a unique identifier (ID), such as a unique number or username. The example social graph 1300 illustrated in FIG. 13 is shown, for didactic purposes, in a two-dimensional visual map representation. In particular embodiments, a social-networking system 160, a client system 130, an assistant system 140, or a third-party system 170 may access the social graph 1300 and related social-graph information for suitable applications. The nodes and edges of the social graph 1300 may be stored as data objects, for example, in a data store (such as a social-graph database). Such a data store may include one or more searchable or queryable indexes of nodes or edges of the social graph 1300.

In particular embodiments, a user node 1302 may correspond to a user of the social-networking system 160 or the assistant system 140. As an example and not by way of limitation, a user may be an individual (human user), an entity (e.g., an enterprise, business, or third-party application), or a group (e.g., of individuals or entities) that interacts or communicates with or over the social-networking system 160 or the assistant system 140. In particular embodiments, when a user registers for an account with the social-networking system 160, the social-networking system 160 may create a user node 1302 corresponding to the user, and store the user node 1302 in one or more data stores. Users and user nodes 1302 described herein may, where appropriate, refer to registered users and user nodes 1302 associated with registered users. In addition or as an alternative, users and user nodes 1302 described herein may, where appropriate, refer to users that have not registered with the social-networking system 160. In particular embodiments, a user node 1302 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 1302 may be associated with one or more data objects corresponding to information associated with a user. In particular embodiments, a user node 1302 may correspond to one or more web interfaces.

In particular embodiments, a concept node 1304 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1304 may be associated with information of a concept provided by a user or information gathered by various systems, including the social-networking system 160 and the assistant system 140. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1304 may be associated with one or more data objects corresponding to information associated with concept node 1304. In particular embodiments, a concept node 1304 may correspond to one or more web interfaces.

In particular embodiments, a node in the social graph 1300 may represent or be represented by a web interface (which may be referred to as a "profile interface"). Profile interfaces may be hosted by or accessible to the social-networking system 160 or the assistant system 1130. Profile interfaces may also be hosted on third-party websites associated with a third-party system 170. As an example and not by way of limitation, a profile interface corresponding to a particular external web interface may be the particular external web interface and the profile interface may correspond to a particular concept node 1304. Profile interfaces may be viewable by all or a selected subset of other users. As an example and not by way of limitation, a user node 1302 may have a corresponding user-profile interface in which the corresponding user may add content, make declarations, or otherwise express himself or herself. As another example and not by way of limitation, a concept node 1304 may have a corresponding concept-profile interface in which one or more users may add content, make declarations, or express themselves, particularly in relation to the concept corresponding to concept node 1304.

In particular embodiments, a concept node 1304 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 1302 corresponding to the user and a concept node 1304 corresponding to the third-party web interface or resource and store edge 1306 in one or more data stores.

In particular embodiments, a pair of nodes in the social graph 1300 may be connected to each other by one or more edges 1306. An edge 1306 connecting a pair of nodes may represent a relationship between the pair of nodes. In particular embodiments, an edge 1306 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 1306 connecting the first user's user node 1302 to the second user's user node 1302 in the social graph 1300 and store edge 1306 as social-graph information in one or more data stores 1613. In the example of FIG. 13, the social graph 1300 includes an edge 1306 indicating a friend relation between user nodes 1302 of user "A" and user "B" and an edge indicating a friend relation between user nodes 1302 of user "C" and user "B." Although this disclosure describes or illustrates particular edges 1306 with particular attributes connecting particular user nodes 1302, this disclosure contemplates any suitable edges 1306 with any suitable attributes connecting user nodes 1302. As an example and not by way of limitation, an edge 1306 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 1300 by one or more edges 1306.

In particular embodiments, an edge 1306 between a user node 1302 and a concept node 1304 may represent a particular action or activity performed by a user associated with user node 1302 toward a concept associated with a concept node 1304. As an example and not by way of limitation, as illustrated in FIG. 13, a user may "like," "attended," "played," "listened," "cooked," "worked at," or "watched" a concept, each of which may correspond to an edge type or subtype. A concept-profile interface corresponding to a concept node 1304 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 1306 and a "used" edge (as illustrated in FIG. 13) between user nodes 1302 corresponding to the user and concept nodes 1304 corresponding to the song and application to indicate that the user listened to the song and used the application. Moreover, the social-networking system 160 may create a "played" edge 1306 (as illustrated in FIG. 13) between concept nodes 1304 corresponding to the song and the application to indicate that the particular song was played by the particular application. In this case, "played" edge 1306 corresponds to an action performed by an external application (SPOTIFY) on an external audio file (the song "Imagine"). Although this disclosure describes particular edges 1306 with particular attributes connecting user nodes 1302 and concept nodes 1304, this disclosure contemplates any suitable edges 1306 with any suitable attributes connecting user nodes 1302 and concept nodes 1304. Moreover, although this disclosure describes edges between a user node 1302 and a concept node 1304 representing a single relationship, this disclosure contemplates edges between a user node 1302 and a concept node 1304 representing one or more relationships. As an example and not by way of limitation, an edge 1306 may represent both that a user likes and has used at a particular concept. Alternatively, another edge 1306 may represent each type of relationship (or multiples of a single relationship) between a user node 1302 and a concept node 1304 (as illustrated in FIG. 13 between user node 1302 for user "E" and concept node 1304 for "SPOTIFY").

In particular embodiments, the social-networking system 160 may create an edge 1306 between a user node 1302 and a concept node 1304 in the social graph 1300. As an example and not by way of limitation, a user viewing a concept-profile interface (such as, for example, by using a web browser or a special-purpose application hosted by the user's client system 130) may indicate that he or she likes the concept represented by the concept node 1304 by clicking or selecting a "Like" icon, which may cause the user's client system 130 to send to the social-networking system 160 a message indicating the user's liking of the concept associated with the concept-profile interface. In response to the message, the social-networking system 160 may create an edge 1306 between user node 1302 associated with the user and concept node 1304, as illustrated by "like" edge 1306 between the user and concept node 1304. In particular embodiments, the social-networking system 160 may store an edge 1306 in one or more data stores. In particular embodiments, an edge 1306 may be automatically formed by the social-networking system 160 in response to a particular user action. As an example and not by way of limitation, if a first user uploads a picture, watches a movie, or listens to a song, an edge 1306 may be formed between user node 1302 corresponding to the first user and concept nodes 1304 corresponding to those concepts. Although this disclosure describes forming particular edges 1306 in particular manners, this disclosure contemplates forming any suitable edges 1306 in any suitable manner.

Figure 14:
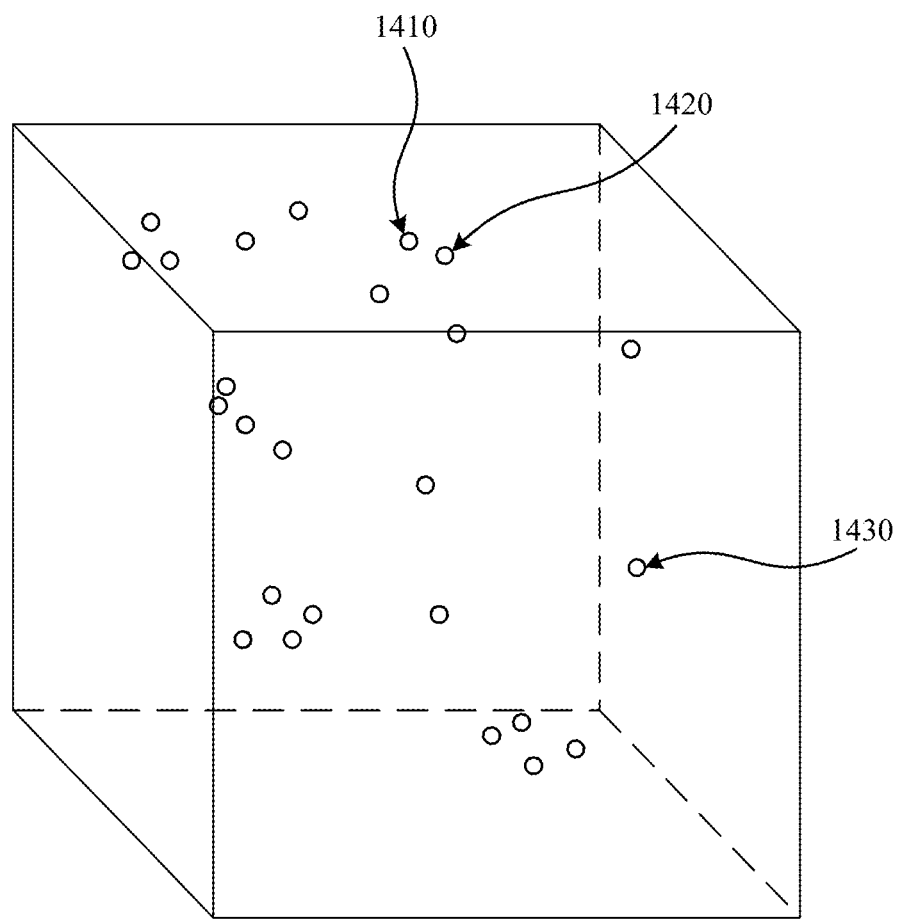
FIG. 14 illustrates an example view of an embedding space.

FIG. 14 illustrates an example view of a vector space 1400. In particular embodiments, an object or an n-gram may be represented in a d-dimensional vector space, where d denotes any suitable number of dimensions. Although the vector space 1400 is illustrated as a three-dimensional space, this is for illustrative purposes only, as the vector space 1400 may be of any suitable dimension. In particular embodiments, an n-gram may be represented in the vector space 1400 as a vector referred to as a term embedding. Each vector may comprise coordinates corresponding to a particular point in the vector space 1400 (i.e., the terminal point of the vector). As an example and not by way of limitation, vectors 1410, 1420, and 1430 may be represented as points in the vector space 1400, as illustrated in FIG. 14. An n-gram may be mapped to a respective vector representation. As an example and not by way of limitation, n-grams $t_1$ and $t_2$ may be mapped to vectors $\vec{v_1}$ and $\vec{v_2}$ in the vector space 1400, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 1400. In particular embodiments, an n-gram may be mapped to a vector representation in the vector space 1400 by using a machine leaning model (e.g., a neural network). The machine learning model may have been trained using a sequence of training data (e.g., a corpus of objects each comprising n-grams).

In particular embodiments, an object may be represented in the vector space 1400 as a vector referred to as a feature vector or an object embedding. As an example and not by way of limitation, objects $e_1$ and $e_2$ may be mapped to vectors $\vec{v_1}$ and $\vec{v_2}$ in the vector space 1400, respectively, by applying a function $\vec{\pi}$, such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 1400. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\|\|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 1400. As an example and not by way of limitation, vector 1410 and vector 1420 may correspond to objects that are more similar to one another than the objects corresponding to vector 1410 and vector 1430, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Figure 15:
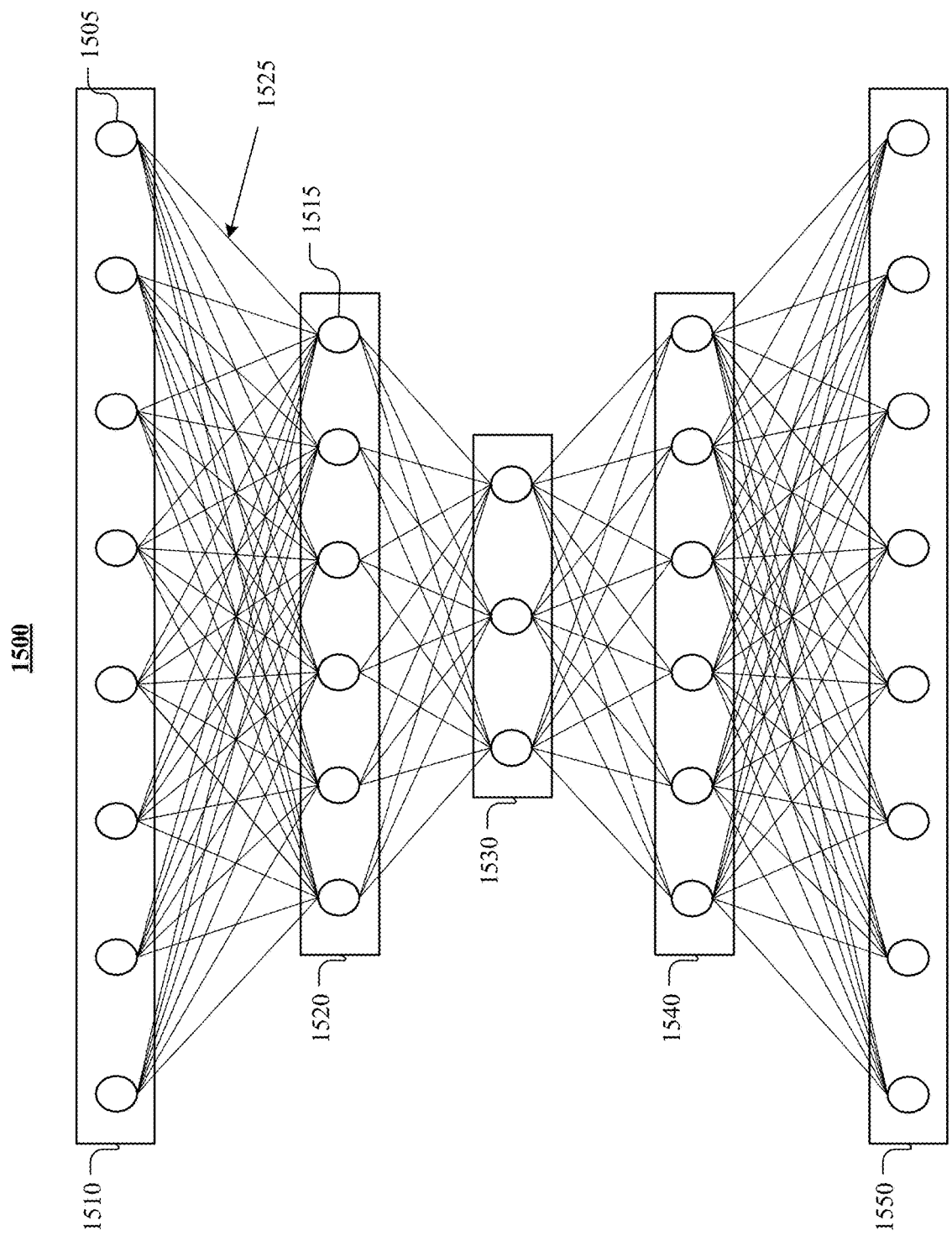
FIG. 15 illustrates an example artificial neural network.

FIG. 15 illustrates an example artificial neural network ("ANN") 1500. In particular embodiments, an ANN may refer to a computational model comprising one or more nodes. Example ANN 1500 may comprise an input layer 1510, hidden layers 1520, 1530, 1560, and an output layer 1550. Each layer of the ANN 1500 may comprise one or more nodes, such as a node 1505 or a node 1515. In particular embodiments, each node of an ANN may be connected to another node of the ANN. As an example and not by way of limitation, each node of the input layer 1510 may be connected to one of more nodes of the hidden layer 1520. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 15 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 15 depicts a connection between each node of the input layer 1510 and each node of the hidden layer 1520, one or more nodes of the input layer 1510 may not be connected to one or more nodes of the hidden layer 1520.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 1520 may comprise the output of one or more nodes of the input layer 1510. As another example and not by way of limitation, the input to each node of the output layer 1550 may comprise the output of one or more nodes of the hidden layer 1560. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1+e^{-s_k}},$$

the hyberbolic tangent function $$F_k(s_k) = \frac{e^{s_k} - e^{-s_k}}{e^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 1525 between the node 1505 and the node 1515 may have a weighting coefficient of 0.4, which may indicate that 0.4 multiplied by the output of the node 1505 is used as an input to the node 1515. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 1500 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 1304 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 1300. A privacy setting may be specified for one or more edges 1306 or edge-types of the social graph 1300, or with respect to one or more nodes 1302, 1304 or node-types of the social graph 1300. The privacy settings applied to a particular edge 1306 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 1304 connected to a user node 1302 of the first user by an edge 1306. The first user may specify privacy settings that apply to a particular edge 1306 connecting to the concept node 1304 of the object, or may specify privacy settings that apply to all edges 1306 connecting to the concept node 1304. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client device 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system 170 or used by other processes or applications associated with the social-networking system 160.

Figure 16:
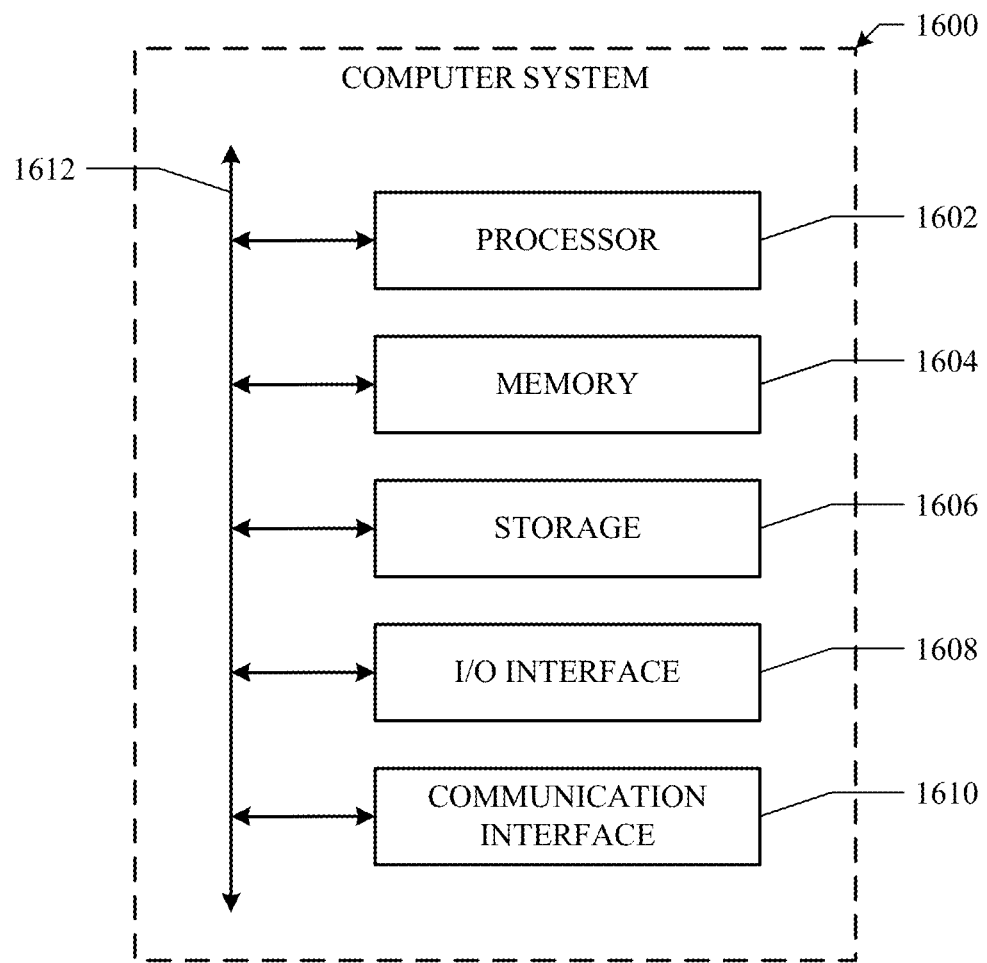
FIG. 16 illustrates an example computer system.

FIG. 16 illustrates an example computer system 1600. In particular embodiments, one or more computer systems 1600 perform one or more steps of one or more methods described or illustrated herein. In particular embodiments, one or more computer systems 1600 provide functionality described or illustrated herein. In particular embodiments, software running on one or more computer systems 1600 performs one or more steps of one or more methods described or illustrated herein or provides functionality described or illustrated herein. Particular embodiments include one or more portions of one or more computer systems 1600. Herein, reference to a computer system may encompass a computing device, and vice versa, where appropriate. Moreover, reference to a computer system may encompass one or more computer systems, where appropriate.

This disclosure contemplates any suitable number of computer systems 1600. This disclosure contemplates computer system 1600 taking any suitable physical form. As example and not by way of limitation, computer system 1600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1600 may include one or more computer systems 1600; be unitary or distributed; span multiple locations; span multiple machines; span multiple data centers; or reside in a cloud, which may include one or more cloud components in one or more networks. Where appropriate, one or more computer systems 1600 may perform without substantial spatial or temporal limitation one or more steps of one or more methods described or illustrated herein. As an example and not by way of limitation, one or more computer systems 1600 may perform in real time or in batch mode one or more steps of one or more methods described or illustrated herein. One or more computer systems 1600 may perform at different times or at different locations one or more steps of one or more methods described or illustrated herein, where appropriate.

In particular embodiments, computer system 1600 includes a processor 1602, memory 1604, storage 1606, an input/output (I/O) interface 1608, a communication interface 1610, and a bus 1612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1602 includes hardware for executing instructions, such as those making up a computer program. As an example and not by way of limitation, to execute instructions, processor 1602 may retrieve (or fetch) the instructions from an internal register, an internal cache, memory 1604, or storage 1606; decode and execute them; and then write one or more results to an internal register, an internal cache, memory 1604, or storage 1606. In particular embodiments, processor 1602 may include one or more internal caches for data, instructions, or addresses. This disclosure contemplates processor 1602 including any suitable number of any suitable internal caches, where appropriate. As an example and not by way of limitation, processor 1602 may include one or more instruction caches, one or more data caches, and one or more translation lookaside buffers (TLBs). Instructions in the instruction caches may be copies of instructions in memory 1604 or storage 1606, and the instruction caches may speed up retrieval of those instructions by processor 1602. Data in the data caches may be copies of data in memory 1604 or storage 1606 for instructions executing at processor 1602 to operate on; the results of previous instructions executed at processor 1602 for access by subsequent instructions executing at processor 1602 or for writing to memory 1604 or storage 1606; or other suitable data. The data caches may speed up read or write operations by processor 1602. The TLBs may speed up virtual-address translation for processor 1602. In particular embodiments, processor 1602 may include one or more internal registers for data, instructions, or addresses. This disclosure contemplates processor 1602 including any suitable number of any suitable internal registers, where appropriate. Where appropriate, processor 1602 may include one or more arithmetic logic units (ALUs); be a multi-core processor; or include one or more processors 1602. Although this disclosure describes and illustrates a particular processor, this disclosure contemplates any suitable processor.

In particular embodiments, memory 1604 includes main memory for storing instructions for processor 1602 to execute or data for processor 1602 to operate on. As an example and not by way of limitation, computer system 1600 may load instructions from storage 1606 or another source (such as, for example, another computer system 1600) to memory 1604. Processor 1602 may then load the instructions from memory 1604 to an internal register or internal cache. To execute the instructions, processor 1602 may retrieve the instructions from the internal register or internal cache and decode them. During or after execution of the instructions, processor 1602 may write one or more results (which may be intermediate or final results) to the internal register or internal cache. Processor 1602 may then write one or more of those results to memory 1604. In particular embodiments, processor 1602 executes only instructions in one or more internal registers or internal caches or in memory 1604 (as opposed to storage 1606 or elsewhere) and operates only on data in one or more internal registers or internal caches or in memory 1604 (as opposed to storage 1606 or elsewhere). One or more memory buses (which may each include an address bus and a data bus) may couple processor 1602 to memory 1604. Bus 1612 may include one or more memory buses, as described below. In particular embodiments, one or more memory management units (MMUs) reside between processor 1602 and memory

1604 and facilitate accesses to memory 1604 requested by processor 1602. In particular embodiments, memory 1604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1604 may include one or more memories 1604, where appropriate. Although this disclosure describes and illustrates particular memory, this disclosure contemplates any suitable memory.

In particular embodiments, storage 1606 includes mass storage for data or instructions. As an example and not by way of limitation, storage 1606 may include a hard disk drive (HDD), a floppy disk drive, flash memory, an optical disc, a magneto-optical disc, magnetic tape, or a Universal Serial Bus (USB) drive or a combination of two or more of these. Storage 1606 may include removable or non-removable (or fixed) media, where appropriate. Storage 1606 may be internal or external to computer system 1600, where appropriate. In particular embodiments, storage 1606 is non-volatile, solid-state memory. In particular embodiments, storage 1606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1606 taking any suitable physical form. Storage 1606 may include one or more storage control units facilitating communication between processor 1602 and storage 1606, where appropriate. Where appropriate, storage 1606 may include one or more storages 1606. Although this disclosure describes and illustrates particular storage, this disclosure contemplates any suitable storage.

In particular embodiments, I/O interface 1608 includes hardware, software, or both, providing one or more interfaces for communication between computer system 1600 and one or more I/O devices. Computer system 1600 may include one or more of these I/O devices, where appropriate. One or more of these I/O devices may enable communication between a person and computer system 1600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1608 for them. Where appropriate, I/O interface 1608 may include one or more device or software drivers enabling processor 1602 to drive one or more of these I/O devices. I/O interface 1608 may include one or more I/O interfaces 1608, where appropriate. Although this disclosure describes and illustrates a particular I/O interface, this disclosure contemplates any suitable I/O interface.

In particular embodiments, communication interface 1610 includes hardware, software, or both providing one or more interfaces for communication (such as, for example, packet-based communication) between computer system 1600 and one or more other computer systems 1600 or one or more networks. As an example and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1610 for it. As an example and not by way of limitation, computer system 1600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1600 may include any suitable communication interface 1610 for any of these networks, where appropriate. Communication interface 1610 may include one or more communication interfaces 1610, where appropriate. Although this disclosure describes and illustrates a particular communication interface, this disclosure contemplates any suitable communication interface.

In particular embodiments, bus 1612 includes hardware, software, or both coupling components of computer system 1600 to each other. As an example and not by way of limitation, bus 1612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1612 may include one or more buses 1612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
    training a baseline machine-learning model based on a neural network comprising a plurality of stages, wherein each stage comprises a plurality of neural blocks;
    accessing a plurality of training samples comprising a plurality of content objects, respectively;
    determining one or more non-local operations, wherein each non-local operation is based on one or more pairwise functions and one or more unary functions, wherein each of the one or more non-local operations is associated with a respective plurality of weight matrices;
    generating one or more non-local blocks based on the plurality of training samples and the one or more non-local operations, wherein the generation comprises initializing the respective plurality of weight matrices associated with each of the one or more non-local operations, and wherein each of the one or more non-local blocks comprises one or more residual connections configured for allowing initial behavior of the baseline machine-learning model to occur after the non-local block is inserted into the baseline machine-learning model if the respective plurality of weight matrices are initialized as zero;
    determining a stage from the plurality of stages of the neural network; and
    training a non-local machine-learning model by inserting each of the one or more non-local blocks in between at least two of the plurality of neural blocks in the determined stage of the neural network.

2. The method of claim 1, wherein the neural network comprises one or more of a convolutional neural network or a recurrent neural network.

3. The method of claim 1, wherein each of the plurality of content objects comprises one or more of a text, an audio clip, an image, or a video.

4. The method of claim 1, wherein the neural network is based on one or more of a two-dimensional architecture or a three-dimensional architecture.

5. The method of claim 1, further comprising:
    generating a plurality of feature representations for the plurality content objects based on the baseline machine-learning model, respectively.

6. The method of claim 5, wherein generating each of the one or more non-local blocks comprises:
    applying each of the one or more non-local operations to the feature representation of one of the plurality of content objects.

7. The method of claim 5, further comprising:
    determining, for each of the plurality of content objects, an output position and a plurality of positions associated with the output position.

8. The method of claim 7, wherein the output position is in one or more of space, time, or spacetime.

9. The method of claim 7, wherein each of the one or more non-local operations is based on $$y_i = \frac{1}{C(x)} \sum_{\forall j} f(x_i, x_j) g(x_j),$$

and wherein
    $x_i$ indicates the feature representation at the output position;
    $x_j$ indicates the feature representation at one of the plurality of positions;
    $y_i$ indicates an output response at the output position;
    $f(x_i, x_j)$ indicates the pairwise function;
    $g(x_j)$ indicates the unary function; and
    $C(x)$ indicates a normalization factor.

10. The method of claim 9, where the pairwise function is based on one or more of:
    a Gaussian function $f(x_i, x_j)=e^{x_i^T x_j}$;
    an embedded Gaussian function $f(x_i, x_j)=e^{\theta(x_i)^T \phi(x_j)}$, wherein $\theta$ is an embedding for $x_i$, and $\phi$ is an embedding for $x_j$;
    a dot product function $f(x_i, x_j)=\theta(x_i)^T \phi(x_j)$; or
    a concatenation function $f(x_i, x_j)=\text{ReLU}(W_f^T[\theta(x_i), \phi(x_j)])$, wherein ReLU indicates a function of a rectified linear unit, and wherein $w_f$ is a weight vector projecting a concatenated vector of $\theta(x_i)$ and $\phi(x_j)$ to a scalar.

11. The method of claim 5, further comprising:
    generating, for each of the plurality of content objects, a subsampled content object by applying subsampling to the feature representation of the content object, wherein the subsampled content object is associated with a subsampled feature representation.

12. The method of claim 11, wherein the subsampling comprises pooling, the pooling comprises one or more of max pooling or average pooling.

13. The method of claim 11, wherein generating each of the one or more non-local blocks comprises:
    applying each of the one or more non-local operations to the feature representation of one of the plurality of content objects and the subsampled feature representation of the subsampled content object corresponding to the content object.

14. The method of claim 11, further comprising:
    determining, for each of the plurality of content objects, an output position; and
    determining, for each of the subsampled content objects corresponding to the content object, a plurality of positions associated with the output position.

15. The method of claim 14, wherein each of the one or more non-local operations is based on a function $$y_i = \frac{1}{C(\hat{x})} \sum \forall j \, f(x_i, \hat{x}_j) g(\hat{x}_j),$$

wherein:
- $x_i$ indicates the feature representation at the output position;
- $\hat{x}_j$ indicates the subsampled feature representation at one of the plurality of positions;
- $y_i$ indicates an output response at the output position;
- $f(x_i, \hat{x}_j)$ indicates the pairwise function;
- $g(\hat{x}_j)$ indicates the unary function; and
- $C(\hat{x})$ indicates a normalization factor.

16. The method of claim 15, where the pairwise function is based on one or more of:
- a Gaussian function $f(x_i, \hat{x}_j) = e^{x_i^T \hat{x}_j}$
- an embedded Gaussian function $f(x_i, \hat{x}_j) = e^{\theta(x_i)^T \phi(\hat{x}_j)}$, wherein $\theta$ is an embedding for $x_i$ and $\phi$ is an embedding for $\hat{x}_j$;
- a dot-product function $f(x_i, \hat{x}_j) = e^{\theta(x_i)^T \phi(\hat{x}_j)}$; or
- a concatenation function $f(x_i, \hat{x}_j) = \text{ReLU}(W_f^T [\theta(x_i), \phi(\hat{x}_j)])$, wherein ReLU indicates a function of a rectified linear unit, and wherein wf is a weight vector projecting a concatenated vector of $\theta(x_i)$ and $\phi(\hat{x}_j)$ to a scalar.

17. The method of claim 1, further comprising:
receiving a querying content object; and
determining a category for the querying content object based on the non-local machine-learning model.

18. One or more computer-readable non-transitory storage media embodying software that is operable when executed to:
train a baseline machine-learning model based on a neural network comprising a plurality of stages, wherein each stage comprises a plurality of neural blocks;
access a plurality of training samples comprising a plurality of content objects, respectively;
determine one or more non-local operations, wherein each non-local operation is based on one or more pairwise functions and one or more unary functions, wherein each of the one or more non-local operations is associated with a respective plurality of weight matrices;
generate one or more non-local blocks based on the plurality of training samples and the one or more non-local operations, wherein the generation comprises initializing the respective plurality of weight matrices associated with each of the one or more non-local operations, and wherein each of the one or more non-local blocks comprises one or more residual connections configured for allowing initial behavior of the baseline machine-learning model to occur after the non-local block is inserted into the baseline machine-learning model if the respective plurality of weight matrices are initialized as zero;
determine a stage from the plurality of stages of the neural network; and
train a non-local machine-learning model by inserting each of the one or more non-local blocks in between at least two of the plurality of neural blocks in the determined stage of the neural network.

19. A system comprising: one or more processors; and a non-transitory memory coupled to the processors comprising instructions executable by the processors, the processors operable when executing the instructions to:
train a baseline machine-learning model based on a neural network comprising a plurality of stages, wherein each stage comprises a plurality of neural blocks;
access a plurality of training samples comprising a plurality of content objects, respectively;
determine one or more non-local operations, wherein each non-local operation is based on one or more pairwise functions and one or more unary functions, wherein each of the one or more non-local operations is associated with a respective plurality of weight matrices;
generate one or more non-local blocks based on the plurality of training samples and the one or more non-local operations, wherein the generation comprises initializing the respective plurality of weight matrices associated with each of the one or more non-local operations, and wherein each of the one or more non-local blocks comprises one or more residual connections configured for allowing initial behavior of the baseline machine-learning model to occur after the non-local block is inserted into the baseline machine-learning model if the respective plurality of weight matrices are initialized as zero;
determine a stage from the plurality of stages of the neural network; and
train a non-local machine-learning model by inserting each of the one or more non-local blocks in between at least two of the plurality of neural blocks in the determined stage of the neural network.

* * * * *